US012445960B2

(12) United States Patent
Sarkis et al.

(10) Patent No.: US 12,445,960 B2
(45) Date of Patent: Oct. 14, 2025

(54) DISCONTINUOUS RECEPTION IN SIDELINK COMMUNICATION BASED ON A DIRECT FRAME NUMBER

(71) Applicant: QUALCOMM Incorporated, San Diego, CA (US)

(72) Inventors: Gabi Sarkis, San Diego, CA (US); Seyedkianoush Hosseini, San Diego, CA (US); Qing Li, Princeton Junction, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 555 days.

(21) Appl. No.: 17/572,128

(22) Filed: Jan. 10, 2022

(65) Prior Publication Data

US 2022/0330147 A1  Oct. 13, 2022

Related U.S. Application Data

(60) Provisional application No. 63/173,912, filed on Apr. 12, 2021.

(51) Int. Cl.
*H04W 52/02* (2009.01)
*H04L 5/00* (2006.01)
(Continued)

(52) U.S. Cl.
CPC ....... *H04W 52/0216* (2013.01); *H04L 5/0048* (2013.01); *H04W 56/001* (2013.01); *H04W 88/06* (2013.01)

(58) Field of Classification Search
CPC ........... H04W 52/0216; H04W 56/001; H04W 88/06; H04L 5/0048
See application file for complete search history.

(56) References Cited

U.S. PATENT DOCUMENTS

2022/0070965 A1  3/2022  Li et al.
2023/0007729 A1*  1/2023  Wang .................... H04W 76/14
(Continued)

FOREIGN PATENT DOCUMENTS

EP         3996426 A1    5/2022
WO   WO-2021002723 A1    1/2021

OTHER PUBLICATIONS

Fujitsu: "Sidelink DRX for Power Saving", 3GPP TSG RAN WG2 Meeting #112-E, 3GPP Draft, R2-2009133, 3rd Generation Partnership Project (3GPP), Mobile Competence Centre, 650, Route Des Lucioles, F-06921 Sophia-Antipolis Cedex, France, vol. RAN WG2, No. e-Meeting, Nov. 2, 2020-Nov. 13, 2020, Oct. 21, 2020 (Oct. 21, 2020), XP051940893, pp. 1-16, Retrieved from the Internet: URL: https://ftp.3gpp.org/tsg_ran/WG2_RL2/TSGR2_112-e/Docs/R2-2009133.zip R2-2009133_8_15_2—Sidelink DRX for PowerSaving_v1.docx [retrieved on Oct. 21, 2020] Sections 4.1-4.3.

(Continued)

*Primary Examiner* — Wayne H Cai
(74) *Attorney, Agent, or Firm* — Loza & Loza, LLP

(57) ABSTRACT

An effective approach for a user equipment (UE) to perform a sidelink communication with another UE in a discontinuous reception (DRX) mode is disclosed. For example, a UE may determine a direct frame number (DFN) timing, and configure a sidelink DRX mode using one or more sidelink DRX parameters based on the DFN timing. The UE may perform a sidelink communication with a second UE during an on-duration of a sidelink DRX cycle in the sidelink DRX mode according to the one or more sidelink DRX parameters.

28 Claims, 18 Drawing Sheets

(51) Int. Cl.
*H04W 56/00* (2009.01)
*H04W 88/06* (2009.01)

(56) References Cited

U.S. PATENT DOCUMENTS

2023/0026332 A1\* 1/2023 Fan ...................... H04L 5/0091
2023/0363044 A1\* 11/2023 Chae .................... H04W 76/28

OTHER PUBLICATIONS

International Search Report and Written Opinion—PCT/US2022/021653—ISA/EPO—Jun. 20, 2022.

\* cited by examiner

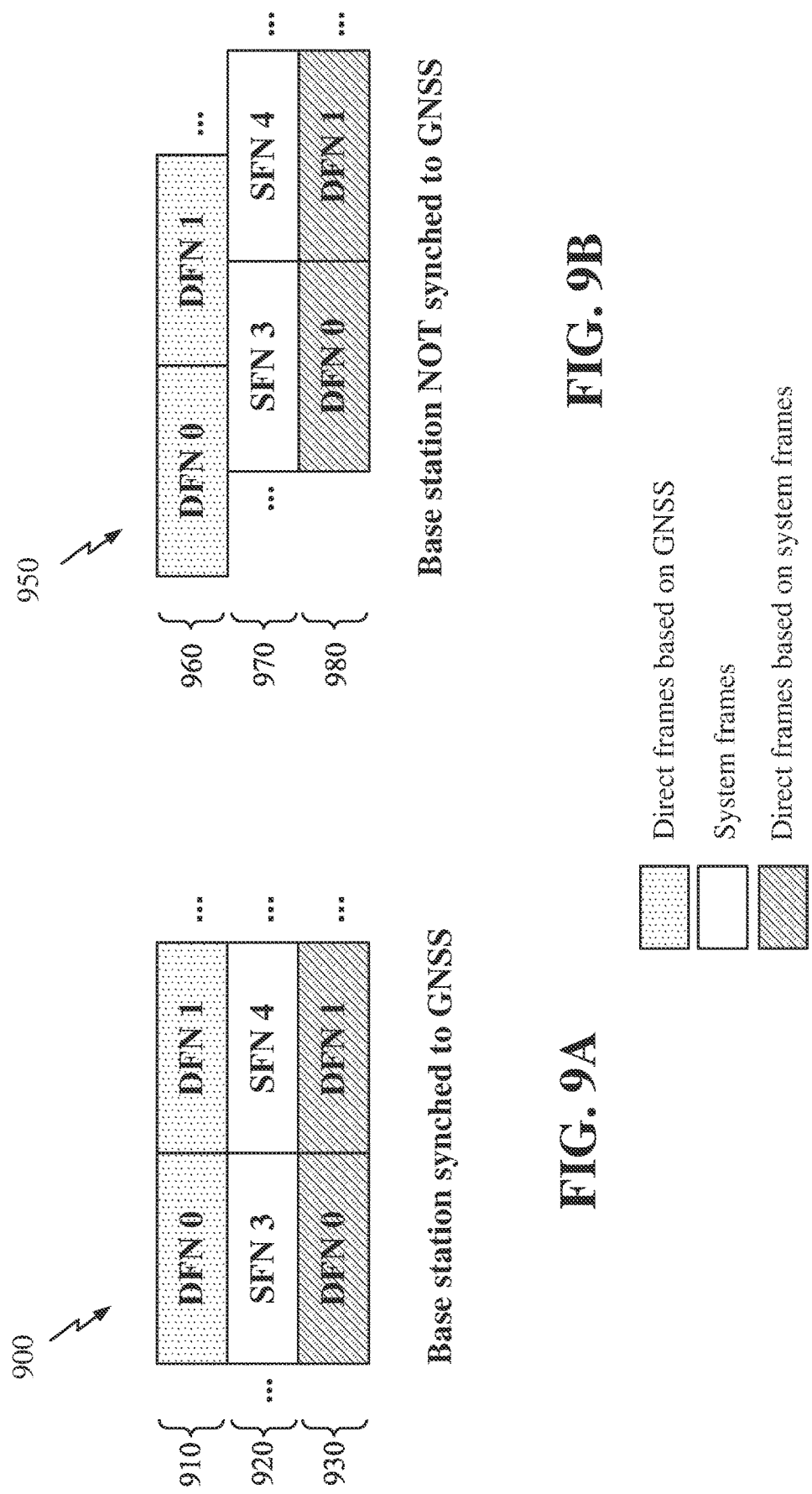

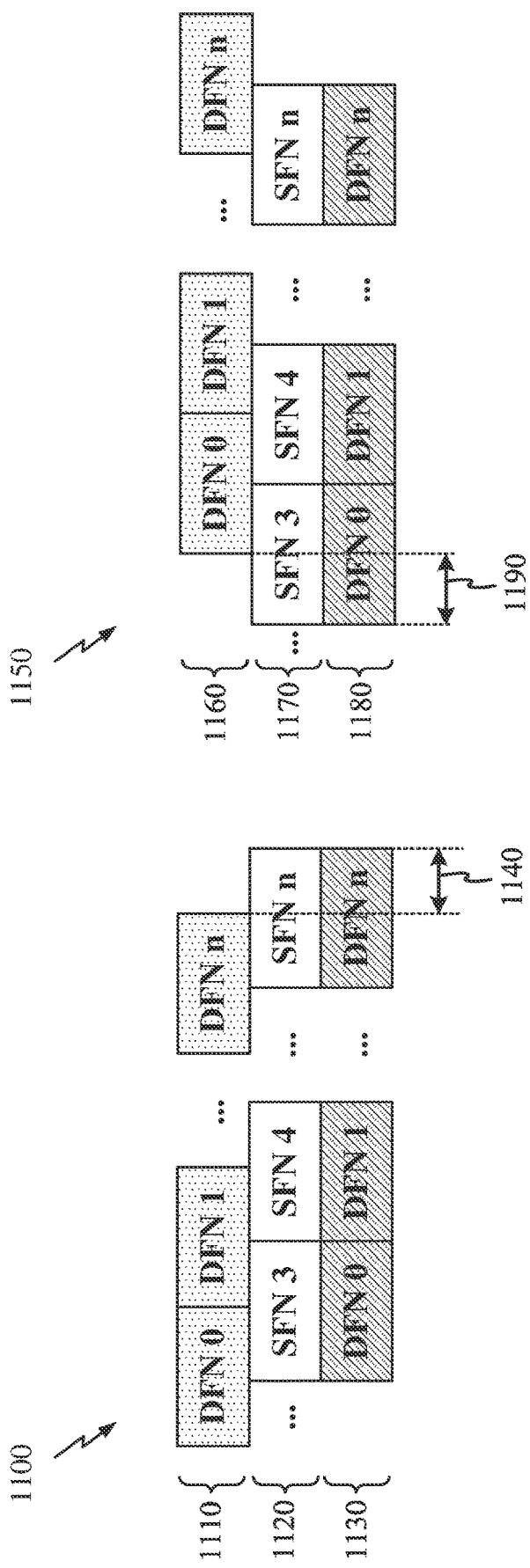

DISCONTINUOUS RECEPTION IN SIDELINK COMMUNICATION BASED ON A DIRECT FRAME NUMBER

CROSS REFERENCE TO RELATED APPLICATION(S)

This application claims priority to and the benefit of provisional patent application No. 63/173,912 filed in the United States Patent & Trademark Office on Apr. 12, 2021, the entire content of which is incorporated herein by reference as if fully set forth below in its entirety and for all applicable purposes.

TECHNICAL FIELD

The technology discussed below relates generally to wireless communication systems, and more particularly, to performing a sidelink communication in a discontinuous reception (DRX) mode using DRX parameter(s) based on a direct frame number.

INTRODUCTION

Wireless communication between devices may be facilitated by various network configurations. In one configuration, a cellular network may enable wireless communication devices (e.g., user equipment (UEs)) to communicate with one another through signaling with a nearby base station or cell. Another wireless communication network configuration is a device to device (D2D) network, in which wireless communication devices may signal one another directly, rather than via an intermediary base station or cell. For example, D2D communication networks may utilize sidelink signaling to facilitate the direct communication between wireless communication devices. In some sidelink network configurations, wireless communication devices may further communicate in a cellular network, generally under the control of a base station. Thus, the wireless communication devices may be configured for uplink and downlink signaling via a base station and further for sidelink signaling directly between the wireless communication devices without transmissions passing through the base station. In wireless communication systems, such as those specified under standards for 5G New Radio (NR), D2D communication between UEs may take place via sidelink communication.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

A discontinuous reception (DRX) mode may be utilized by a user equipment (UE) to switch the UE ON only for a certain ON duration per DRX cycle in the DRX mode. The DRX mode may be defined by at least an ON duration for switching the LE on during the DRX cycle, and an offset from a reference time for starting the DRX mode. For a communication between a UE and a base station, the offset may be in reference to a reference time associated with a system frame number (SFN) timing. However, in a sidelink communication between UEs, certain UEs may not have an SFN and some UEs may have different SFN timings. Hence, relying on the SFN timing to perform a sidelink communication between UEs in a DRX mode may result in ON durations of DRX cycles in different UEs not overlapping with each other, and thus may cause difficulty in performing the sidelink communication. According to some aspects of the disclosure, the UE may configure a sidelink DRX mode using DRX parameters based on direct frame number (DFN) timing, and then perform a sidelink communication in the sidelink DRX mode.

In one example, a method of wireless communication by a LE is disclosed. The method includes determining a DFN timing, configuring a sidelink DRX mode using one or more sidelink DRX parameters based on the DFN timing, and performing a sidelink communication with a second UE during an on-duration of a sidelink DRX cycle in the sidelink DRX mode according to the one or more sidelink DRX parameters.

In another example, a UE for wireless communication is disclosed. The UE includes at least one processor, a transceiver communicatively coupled to the at least one processor, and a memory communicatively coupled to the at least one processor. The at least one processor may be configured to determine a DFN timing, configure a sidelink DRX mode using one or more sidelink DRX parameters based on the DFN timing, and perform a sidelink communication with a second UE during an on-duration of a sidelink DRX cycle in the sidelink DRX mode according to the one or more sidelink DRX parameters.

In another example, a non-transitory computer-readable storage medium having instructions for a UE thereon may be disclosed. The instructions, when executed by a processing circuit, cause the processing circuit to determine a DFN timing, configure a sidelink DRX mode using one or more sidelink DRX parameters based on the DFN timing, and perform a sidelink communication with a second UE during an on-duration of a sidelink DRX cycle in the sidelink DRX mode according to the one or more sidelink DRX parameters.

In a further example, a UE for wireless communication may be disclosed. The UE includes means for determining a DFN timing, means for configuring a sidelink DRX mode using one or more sidelink DRX parameters based on the DFN timing, and means for performing a sidelink communication with a second UE during an on-duration of a sidelink DRX cycle in the sidelink DRX mode according to the one or more sidelink DRX parameters.

In one example, a method of wireless communication by a base station is disclosed. The method includes determining a DFN indicator, and transmitting the DFN indicator to a first UE to cause the first UE to configure a sidelink DRX mode using one or more sidelink DRX parameters based on a DFN timing that is based on the DFN indicator, wherein a sidelink communication between the first UE and a second UE is performed during an on-duration of a sidelink DRX cycle in the sidelink DRX mode according to the one or more sidelink DRX parameters.

In another example, a base station for wireless communication is disclosed. The base station includes at least one processor, a transceiver communicatively coupled to the at least one processor, and a memory communicatively coupled to the at least one processor. The at least one processor may be configured to determine a DFN indicator, and transmit the DFN indicator to a first UE to cause the first UE to configure a sidelink DRX mode using one or more sidelink DRX parameters based on a DFN timing that is based on the DFN indicator, wherein a sidelink communication between the first UE and a second UE is performed during an on-duration of a sidelink DRX cycle in the sidelink DRX mode according to the one or more sidelink DRX parameters.

In another example, a non-transitory processor-readable storage medium having instructions for a base station thereon may be disclosed. The instructions, when executed by a processing circuit, cause the processing circuit to determine a DFN indicator, and transmit the DFN indicator to a first UE to cause the first UE to configure a sidelink DRX mode using one or more sidelink DRX parameters based on a DFN timing that is based on the DFN indicator, wherein a sidelink communication between the first UE and a second UE is performed during an on-duration of a sidelink DRX cycle in the sidelink DRX mode according to the one or more sidelink DRX parameters.

In a further example, a base station for wireless communication may be disclosed. The base station includes means for determining a DFN indicator, and means for transmitting the DFN indicator to a first UE to cause the first UE to configure a sidelink DRX mode using one or more sidelink DRX parameters based on a DFN timing that is based on the DFN indicator, wherein a sidelink communication between the first UE and a second UE is performed during an on-duration of a sidelink DRX cycle in the sidelink DRX mode according to the one or more sidelink DRX parameters.

These and other aspects of the disclosure will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 9A is an example diagram illustrating direct frames based on a DFN timing determined based on an SFN timing, system frames, and GNSS-based direct frames when the base station is synchronized to the GNSS time, according to some aspects.

FIG. 9B is an example diagram illustrating direct frames based on a DFN timing determined based on an SFN timing, system frames, and GNSS-based direct frames when the base station is not synchronized to the GNSS time, according to some aspects.

FIG. 11A is an example diagram illustrating direct frames based on a DFN timing determined based on an SFN timing, system frames, and GNSS-based direct frames when the base station is not synchronized to the GNSS time, according to some aspects.

FIG. 11B is an example diagram illustrating direct frames based on a DFN timing determined based on an SFN timing, system frames, and GNSS-based direct frames when the base station is not synchronized to the GNSS time, according to some aspects.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
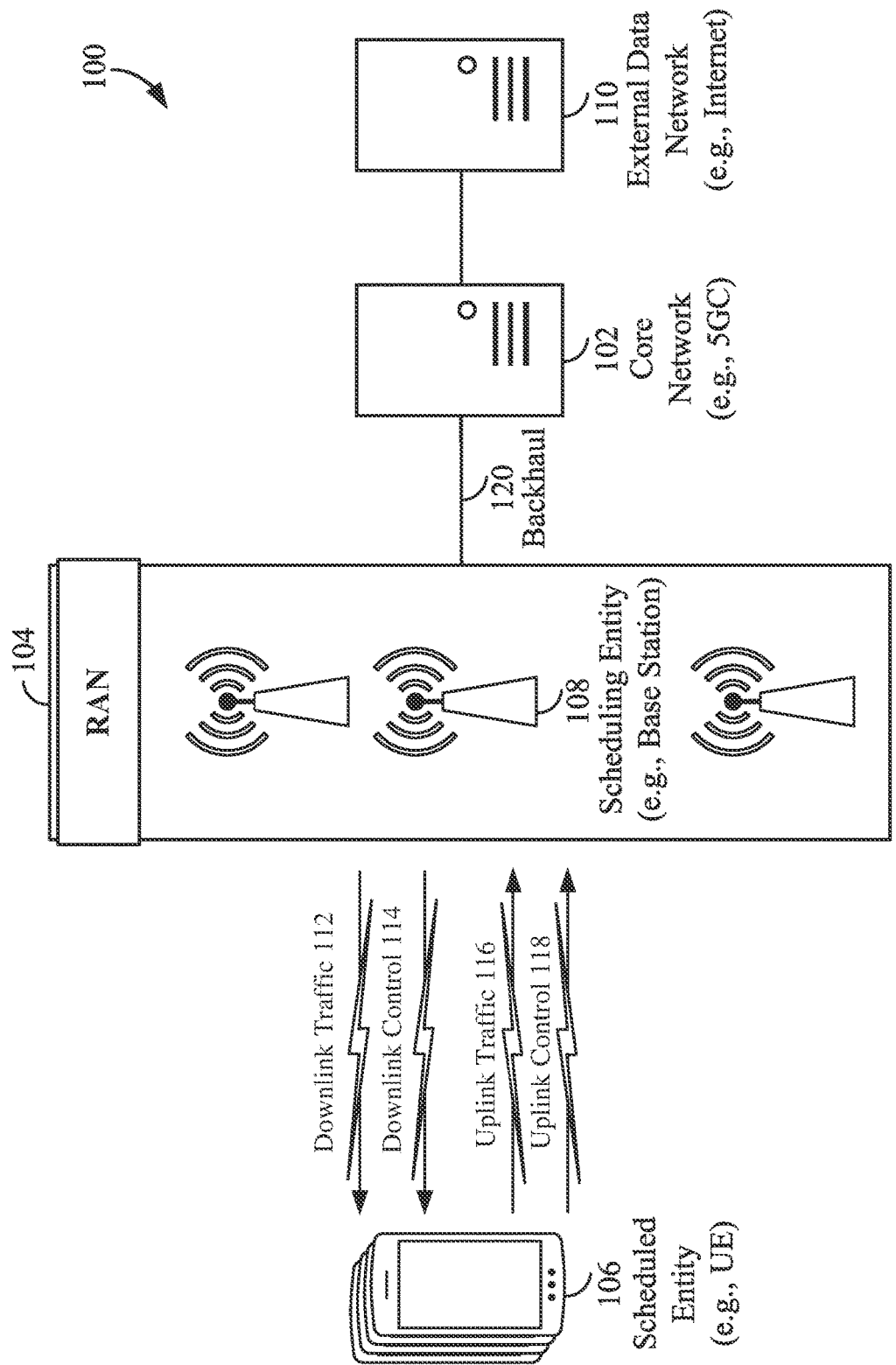
FIG. 1 is a schematic illustration of a wireless communication system according to some aspects.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP) or some other suitable terminology. In some examples, a base station may include two or more TRPs that may be collocated or non-collocated. Each TRP may communicate on the same or different carrier frequency within the same or different frequency band.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; vehicles; etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information. e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
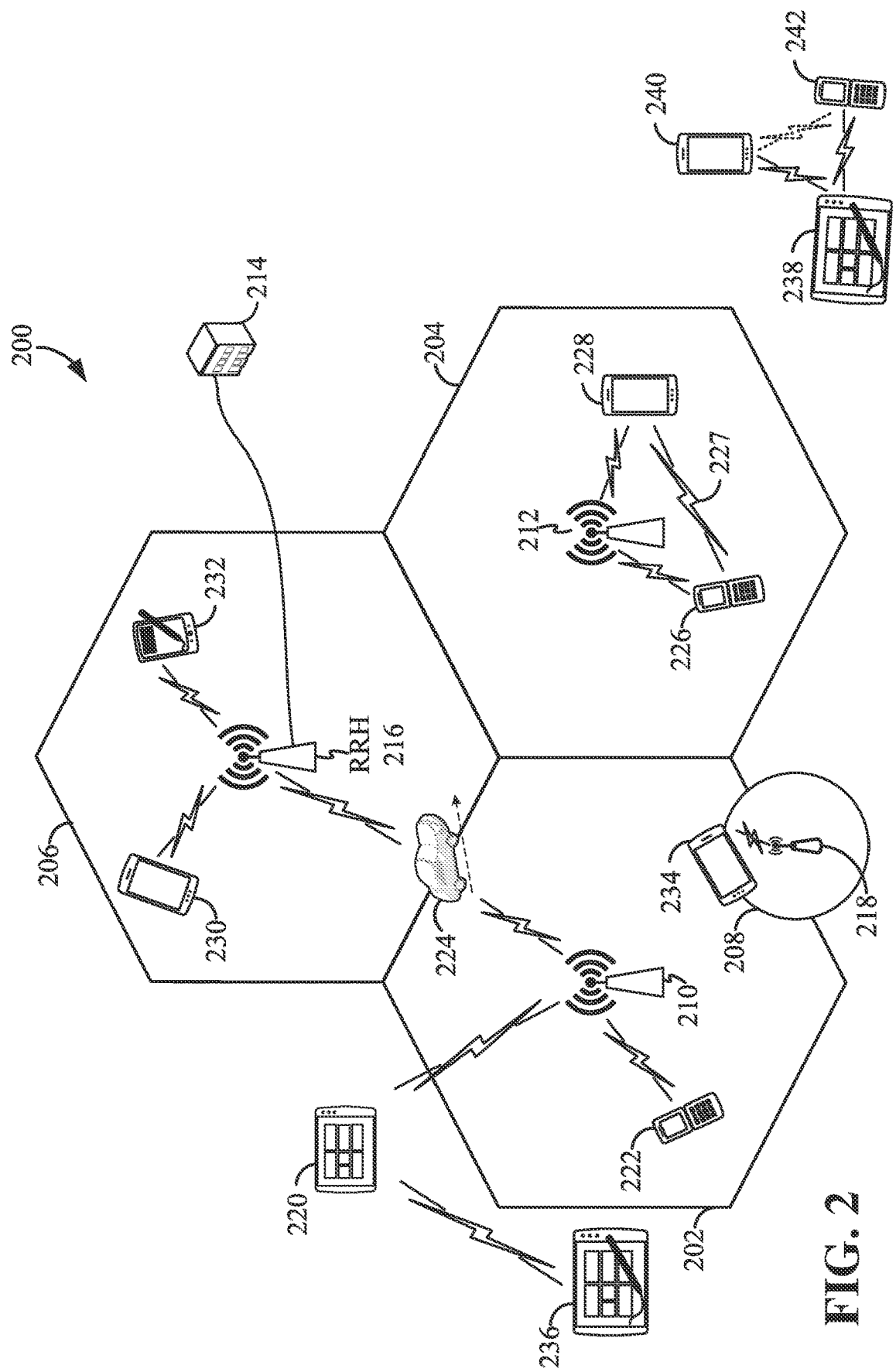
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a mobile device 220, which may be configured to function as a base station. That is, in some examples, a cell may not necessarily be stationary, and the geographic area of the cell may move according to the location of a mobile base station such as the mobile device 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., mobile device 220) may be configured to function as a UE. For example, the mobile device 220 may operate within cell 202 by communicating with base station 210.

Base stations are not the only entities that may function as a scheduling entity. That is, in some examples, a UE may function as a scheduling entity, scheduling resources for one or more scheduled entities (e.g., one or more other UEs). For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication. In either case, such sidelink signaling 227 and 237 may be implemented in a peer-to-peer (P2P) network, a device-to-device (D2D) network, a vehicle-to-vehicle (V2V) network, a vehicle-to-everything (V2X) network, a mesh network, or other suitable direct link network.

In some examples, a D2D relay framework may be included within a cellular network to facilitate relaying of communication to/from the base station 212 via D2D links (e.g., sidelinks 227 or 237). For example, one or more UEs (e.g., UE 228) within the coverage area of the base station 212 may operate as relaying UEs to extend the coverage of the base station 212, improve the transmission reliability to one or more UEs (e.g., UE 226), and/or to allow the base station to recover from a failed UE link due to, for example, blockage or fading.

Two primary technologies that may be used by V2X networks include dedicated short range communication (DSRC) based on IEEE 802.11p standards and cellular V2X based on LTE and/or 5G (New Radio) standards. Various aspects of the present disclosure may relate to New Radio (NR) cellular V2X networks, referred to herein as V2X networks, for simplicity. However, it should be understood that the concepts disclosed herein may not be limited to a particular V2X standard or may be directed to sidelink networks other than V2X networks.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 200, the ability for a UE to communicate while moving, independent of their location, is referred to as mobility. The various physical channels between the UE and the RAN are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In some examples, a RAN 200 may enable mobility and handovers (i.e., the transfer of a UE's connection from one radio channel to another). For example, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In various implementations, the air interface in the RAN 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the RAN 200 may utilize one or more multiplexing and multiple access algorithms to enable simultaneous communication of the various devices. For example, 5G NR specifications provide multiple access for UL or reverse link transmissions from UEs 222 and 224 to base station 210, and for multiplexing DL or forward link transmissions from the base station 210 to UEs 222 and 224 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 200 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly. e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
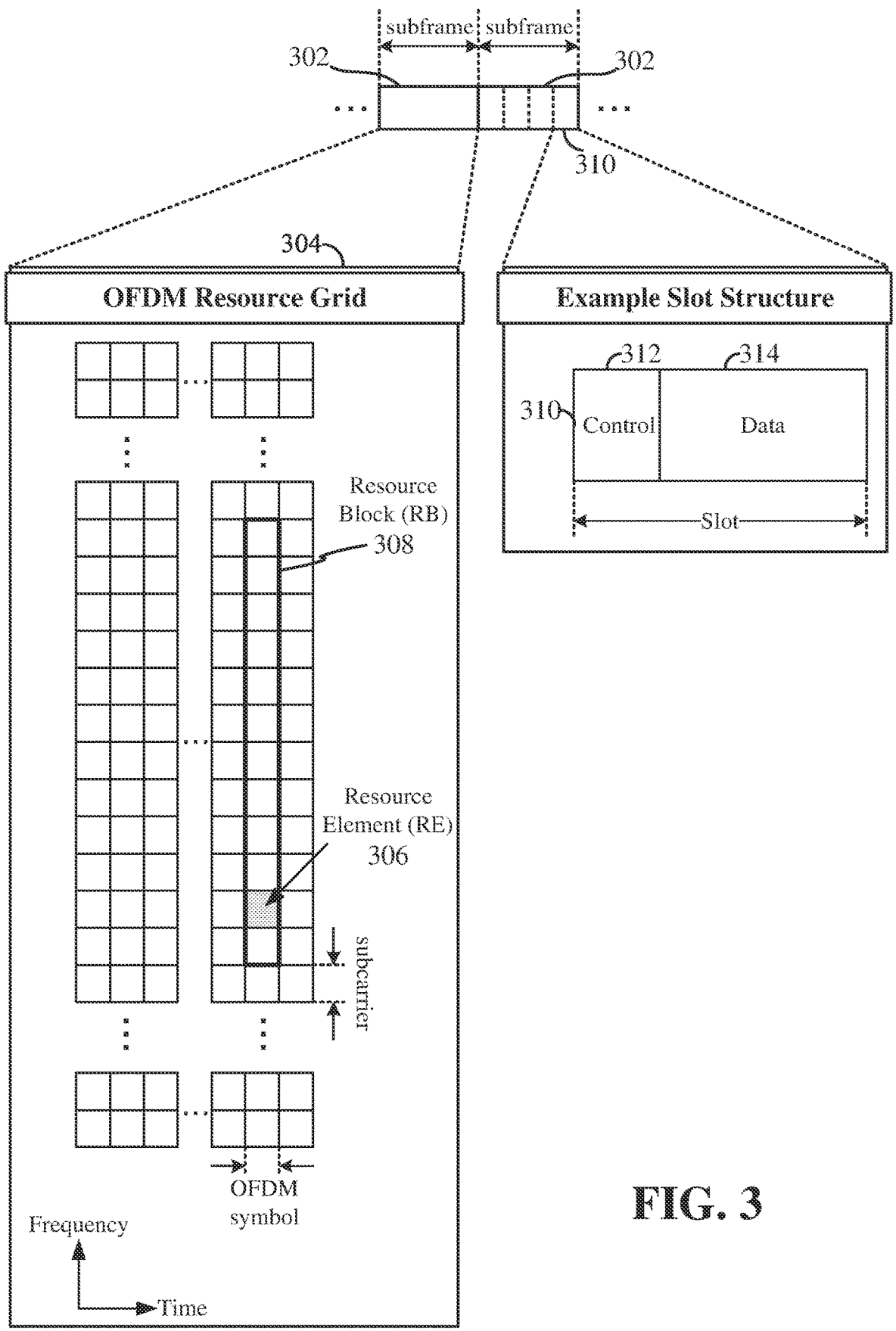
FIG. 3 is a schematic illustration of an organization of wireless resources in an air interface utilizing orthogonal frequency divisional multiplexing (OFDM) according to some embodiments.

Referring now to FIG. 3, an expanded view of an exemplary subframe 302 is illustrated, showing an OFDM resource grid. However, as those skilled in the art will readily appreciate, the physical (PHY) layer transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of UEs or sidelink devices (hereinafter collectively referred to as UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE/sidelink device implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 12 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 20, 80, or 120 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORE-SET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 3 are not necessarily all of the channels or carriers that may be utilized between devices, and those of ordinary skill in the art will recognize that other channels or carriers may be utilized in addition to those illustrated, such as other traffic, control, and feedback channels.

Figure 4:
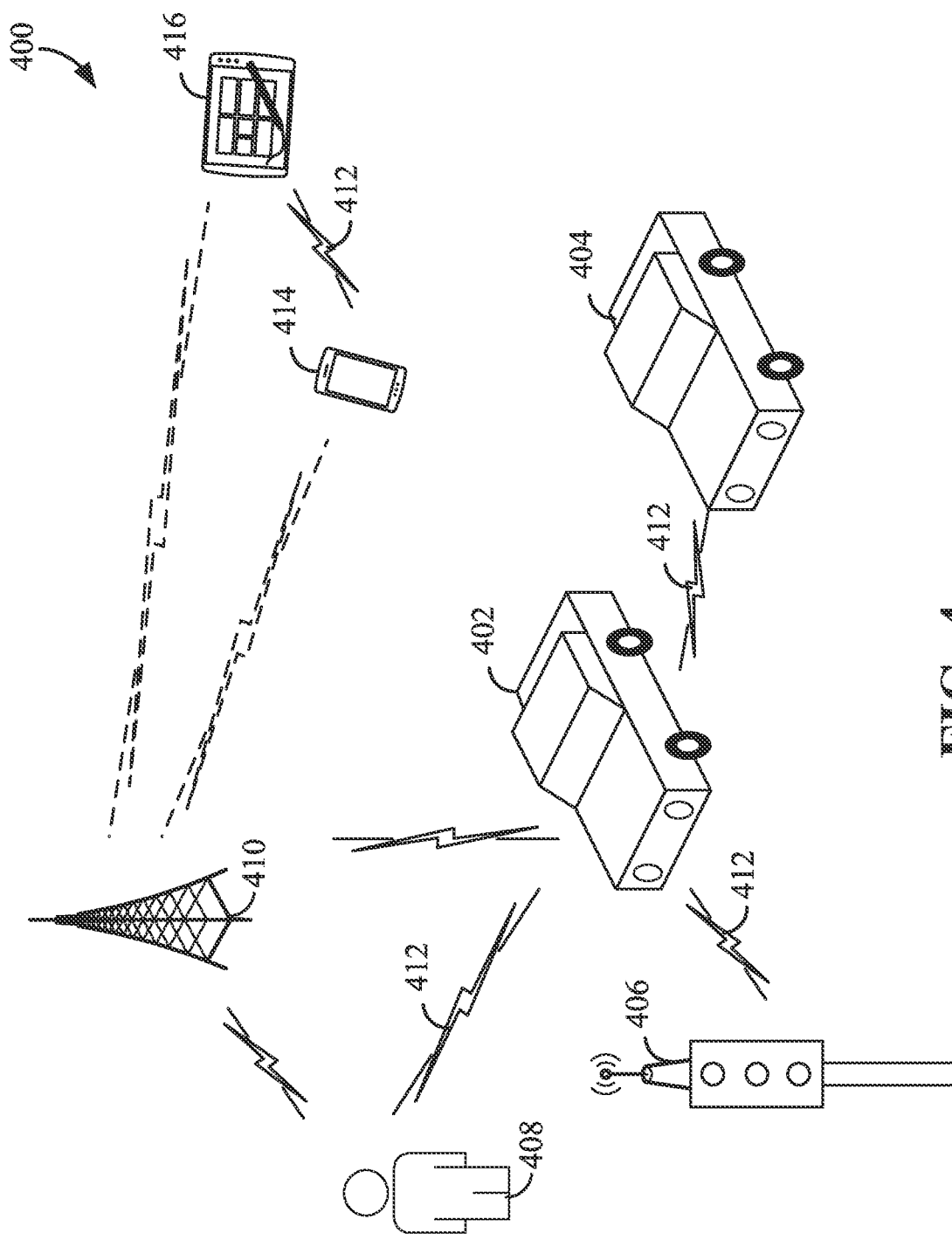
FIG. 4 illustrates an example of a wireless communication network configured to support D2D or sidelink communication.

FIG. 4 illustrates an example of a wireless communication network 400 configured to support D2D or sidelink communication. In some examples, sidelink communication may include V2X communication. V2X communication involves the wireless exchange of information directly between not only vehicles (e.g., vehicles 402 and 404) themselves, but also directly between vehicles 402/404 and infrastructure (e.g., roadside units (RSUs) 406), such as streetlights, buildings, traffic cameras, tollbooths or other stationary objects, vehicles 402/404 and pedestrians 408, and vehicles 402/404 and wireless communication networks (e.g., base station 410). In some examples, V2X communication may be implemented in accordance with the New Radio (NR) cellular V2X standard defined by 3GPP. Release 16, or other suitable standard.

V2X communication enables vehicles 402 and 404 to obtain information related to the weather, nearby accidents, road conditions, activities of nearby vehicles and pedestrians, objects nearby the vehicle, and other pertinent information that may be utilized to improve the vehicle driving experience and increase vehicle safety. For example, such V2X data may enable autonomous driving and improve road safety and traffic efficiency. For example, the exchanged V2X data may be utilized by a V2X connected vehicle 402 and 404 to provide in-vehicle collision warnings, road hazard warnings, approaching emergency vehicle warnings, pre-/post-crash warnings and information, emergency brake warnings, traffic jam ahead warnings, lane change warnings, intelligent navigation services, and other similar information. In addition, V2X data received by a V2X connected mobile device of a pedestrian/cyclist 408 may be utilized to trigger a warning sound, vibration, flashing light, etc., in case of imminent danger.

The sidelink communication between vehicle-UEs (V-UEs) 402 and 404 or between a V-UE 402 or 404 and either an RSU 406 or a pedestrian-UE (P-UE) 408 may occur over a sidelink 412 utilizing a proximity service (ProSe) PC5 interface. In various aspects of the disclosure, the PC5 interface may further be utilized to support D2D sidelink 412 communication in other proximity use cases (e.g., other than V2X). Examples of other proximity use cases may include smart wearables, public safety, or commercial (e.g., entertainment, education, office, medical, and/or interactive) based proximity services. In the example shown in FIG. 4, ProSe communication may further occur between UEs 414 and 416.

ProSe communication may support different operational scenarios, such as in-coverage, out-of-coverage, and partial coverage. Out-of-coverage refers to a scenario in which UEs (e.g., UEs 414 and 416) are outside of the coverage area of a base station (e.g., base station 410), but each are still configured for ProSe communication. Partial coverage refers to a scenario in which some of the UEs (e.g., V-UE 404) are outside of the coverage area of the base station 410, while other UEs (e.g., V-UE 402 and P-UE 408) are in communication with the base station 410. In-coverage refers to a scenario in which UEs (e.g., V-UE 402 and P-UE 408) are in communication with the base station 410 (e.g., gNB) via a Uu (e.g., cellular interface) connection to receive ProSe service authorization and provisioning information to support ProSe operations.

To facilitate D2D sidelink communication between, for example, UEs 414 and 416 over the sidelink 412, the UEs 414 and 416 may transmit discovery signals therebetween. In some examples, each discovery signal may include a synchronization signal, such as a primary synchronization signal (PSS) and/or a secondary synchronization signal (SSS) that facilitates device discovery and enables synchronization of communication on the sidelink 412. For example, the discovery signal may be utilized by the UE 416 to measure the signal strength and channel status of a potential sidelink (e.g., sidelink 412) with another UE (e.g., UE 414). The UE 416 may utilize the measurement results to select a UE (e.g., UE 414) for sidelink communication or relay communication.

In 5G NR sidelink, sidelink communication may utilize transmission or reception resource pools. For example, the minimum resource allocation unit in frequency may be a sub-channel (e.g., which may include, for example, 10, 15, 20, 25, 50, 75, or 100 consecutive resource blocks) and the minimum resource allocation unit in time may be one slot. A radio resource control (RRC) configuration of the resource pools may be either pre-configured (e.g., a factory setting on the UE determined, for example, by sidelink standards or specifications) or configured by a base station (e.g., base station 410).

In addition, there may be two main resource allocation modes of operation for sidelink (e.g., PC5) communications. In a first mode, Mode 1, a base station (e.g., gNB) 410 may allocate resources to sidelink devices (e.g., V2X devices or other sidelink devices) for sidelink communication between the sidelink devices in various manners. For example, the base station 410 may allocate sidelink resources dynamically (e.g., a dynamic grant) to sidelink devices, in response to requests for sidelink resources from the sidelink devices. The base station 410 may further activate preconfigured sidelink grants (e.g., configured grants) for sidelink communication among the sidelink devices. In Mode 1, sidelink feedback may be reported back to the base station 410 by a transmitting sidelink device.

In a second mode, Mode 2, the sidelink devices may autonomously select sidelink resources for sidelink communication therebetween. In some examples, a transmitting sidelink device may perform resource/channel sensing to select resources (e.g., sub-channels) on the sidelink channel that are unoccupied. Signaling on the sidelink is the same between the two modes. Therefore, from a receiver's point of view, there is no difference between the modes.

In some examples, sidelink (e.g., PC5) communication may be scheduled by use of sidelink control information (SCI). SCI may include two SCI stages. Stage 1 sidelink control information (first stage SCI) may be referred to herein as SCI-1. Stage 2 sidelink control information (second stage SCI) may be referred to herein as SCI-2.

SCI-1 may be transmitted on a physical sidelink control channel (PSCCH). SCI-1 may include information for resource allocation of a sidelink resource and for decoding of the second stage of sidelink control information (i.e., SCI-2). SCI-1 may further identify a priority level (e.g., Quality of Service (QoS)) of a PSSCH. For example, ultra-reliable-low-latency communication (URLLC) traffic may have a higher priority than text message traffic (e.g., short message service (SMS) traffic). SCI-1 may also include a physical sidelink shared channel (PSSCH) resource assignment and a resource reservation period (if enabled). Additionally, SCI-1 may include a PSSCH demodulation reference signal (DMRS) pattern (if more than one pattern is configured). The DMRS may be used by a receiver for radio channel estimation for demodulation of the associated physical channel. As indicated, SCI-1 may also include information about the SCI-2, for example, SCI-1 may disclose the format of the SCI-2. Here, the format indicates the resource size of SCI-2 (e.g., a number of REs that are allotted for SCI-2), a number of a PSSCH DMRS port(s), and a modulation and coding scheme (MCS) index. In some examples, SCI-1 may use two bits to indicate the SCI-2 format. Thus, in this example, four different SCI-2 formats may be supported. SCI-1 may include other information that is useful for establishing and decoding a PSSCH resource.

SCI-2 may also be transmitted on the PSCCH and may contain information for decoding the PSSCH. According to some aspects, SCI-2 includes a 16-bit layer 1 (L1) destination identifier (ID), an 8-bit L1 source ID, a hybrid automatic repeat request (HARQ) process ID, a new data indicator (NDI), and a redundancy version (RV). For unicast communications, SCI-2 may further include a CSI report trigger. For groupcast communications, SCI-2 may further include a zone identifier and a maximum communication range for NACK. SCI-2 may include other information that is useful for establishing and decoding a PSSCH resource.

Figures 5A, 5B:
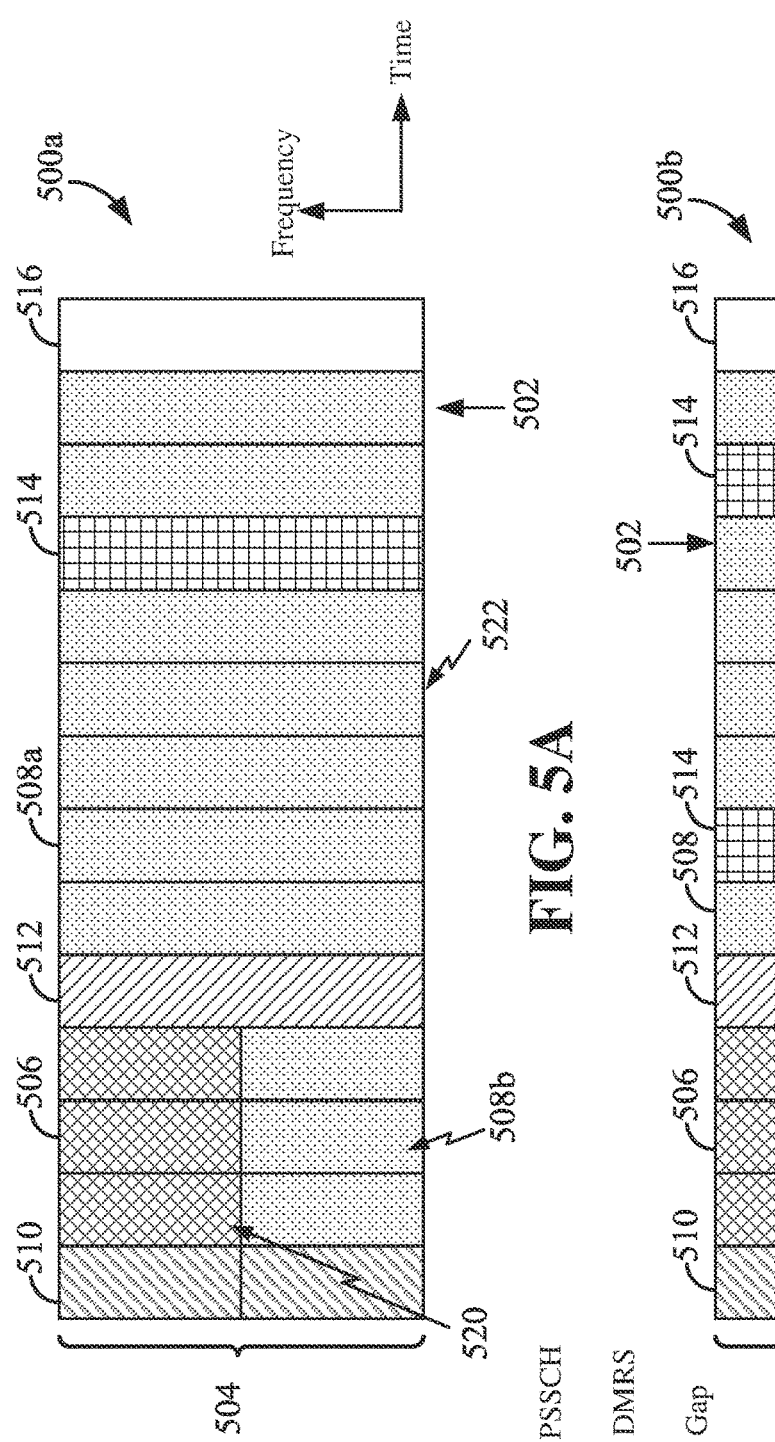
FIGS. 5A and 5B are diagrams illustrating examples of sidelink slot structures according to some aspects.

FIGS. 5A and 5B are diagrams illustrating examples of sidelink slot structures according to some aspects. The sidelink slot structures may be utilized, for example, in a V2X or other D2D network implementing sidelink. In the examples shown in FIGS. 5A and 5B, time is in the horizontal direction with units of symbols 502 (e.g., OFDM symbols); and frequency is in the vertical direction. Here, a carrier bandwidth 504 allocated for sidelink wireless communication is illustrated along the frequency axis. The carrier bandwidth 504 may include a plurality of sub-channels, where each sub-channel may include a configurable number of PRBs (e.g., 10, 14, 20, 24, 40, 44, or 100 PRBs).

Each of FIGS. 5A and 5B illustrate an example of a respective slot 500a or 500b including fourteen symbols 502 that may be used for sidelink communication. However, it should be understood that sidelink communication can be configured to occupy fewer than fourteen symbols in a slot 500a or 500b, and the disclosure is not limited to any particular number of symbols 502. Each sidelink slot 500a and 500b includes a physical sidelink control channel (PSCCH) 506 occupying a control region 518 of the slot 500a and 500b and a physical sidelink shared channel (PSSCH) 508 occupying a data region 520 of the slot 500a and 500b. The PSCCH 506 and PSSCH 508 are each transmitted on one or more symbols 502 of the slot 500a. The PSCCH 506 includes, for example, SCI-1 that schedules transmission of data traffic on time-frequency resources of the corresponding PSSCH 508. As shown in FIGS. 5A and 5B, the PSCCH 506 and corresponding PSSCH 508 are transmitted in the same slot 500a and 500b. In other examples, the PSCCH 506 may schedule a PSSCH in a subsequent slot.

In some examples, the PSCCH 506 duration is configured to be two or three symbols. In addition, the PSCCH 506 may be configured to span a configurable number of PRBs, limited to a single sub-channel. For example, the PSCCH 506 may span 10, 12, 14, 20, or 24 PRBs of a single sub-channel. A DMRS may further be present in every PSCCH symbol. In some examples, the DMRS may be placed on every fourth RE of the PSCCH 506. A frequency domain orthogonal cover code (FD-OCC) may further be applied to the PSCCH DMRS to reduce the impact of colliding PSCCH transmissions on the sidelink channel. For example, a transmitting UE may randomly select the FD-OCC from a set of pre-defined FD-OCCs. In each of the examples shown in FIGS. 5A and 5B, the starting symbol for the PSCCH 506 is the second symbol of the corresponding slot 500a or 500b and the PSCCH 506 spans three symbols 502.

The PSSCH 508 may be time-division multiplexed (TDMed) with the PSCCH 506 and/or frequency-division multiplexed (FDMed) with the PSCCH 506. In the example shown in FIG. 5A, the PSSCH 508 includes a first portion 508a that is TDMed with the PSCCH 506 and a second portion 508b that is FDMed with the PSCCH 506. In the example shown in FIG. 5B, the PSSCH 508 is TDMed with the PSCCH 506.

One and two layer transmissions of the PSSCH 508 may be supported with various modulation orders (e.g., quadrature phase shift keying (QPSK), 16 quadrature amplitude modulation (16-QAM), 64-QAM and 246-QAM). In addition, the PSSCH 508 may include DMRSs 514 configured in a two, three, or four symbol DMRS pattern. For example, slot 500a shown in FIG. 5A illustrates a two symbol DMRS pattern, while slot 500b shown in FIG. 5B illustrates a three symbol DMRS pattern. In some examples, the transmitting UE can select the DMRS pattern and indicate the selected DMRS pattern in SCI-1, according to channel conditions. The DMRS pattern may be selected, for example, based on the number of PSSCH 508 symbols in the slot 500a or 500b. In addition, a gap symbol 516 is present after the PSSCH 508 in each slot 500a and 500b.

Each slot 500a and 500b further includes SCI-2 512 mapped to contiguous RBs in the PSSCH 508 starting from the first symbol containing a PSSCH DMRS. In the example shown in FIG. 5A, the first symbol containing a PSSCH DMRS is the fifth symbol occurring immediately after the last symbol carrying the PSCCH 506. Therefore, the SCI-2 512 is mapped to RBs within the fifth symbol. In the example shown in FIG. 5B, the first symbol containing a PSSCH DMRS is the second symbol, which also includes the PSCCH 506. In addition, the SCI-2/PSSCH DMRS 512 are shown spanning symbols two through five. As a result, the SCI-2/PSSCH DMRS 512 may be FDMed with the PSCCH 506 in symbols two through four and TDMed with the PSCCH 506 in symbol five.

The SCI-2 may be scrambled separately from the sidelink shared channel. In addition, the SCI-2 may utilize QPSK. When the PSSCH transmission spans two layers, the SCI-2 modulation symbols may be copied on (e.g., repeated on) both layers. The SCI-1 in the PSCCH 506 may be blind decoded at the receiving wireless communication device. However, since the format, starting location, and number of REs of the SCI-2 512 may be derived from the SCI-1, blind decoding of SCI-2 is not needed at the receiver (receiving UE).

In each of FIGS. 5A and 5B, the second symbol of each slot 500a and 500b is copied onto (repeated on) a first symbol 510 thereof for automatic gain control (AGC) settling. For example, in FIG. 5A, the second symbol containing the PSCCH 506 FDMed with the PSSCH 508b may be transmitted on both the first symbol and the second symbol. In the example shown in FIG. 5B, the second symbol containing the PSCCH 506 FDMed with the SCI-2/PSSCH DMRS 512 may be transmitted on both the first symbol and the second symbol.

Figure 6:
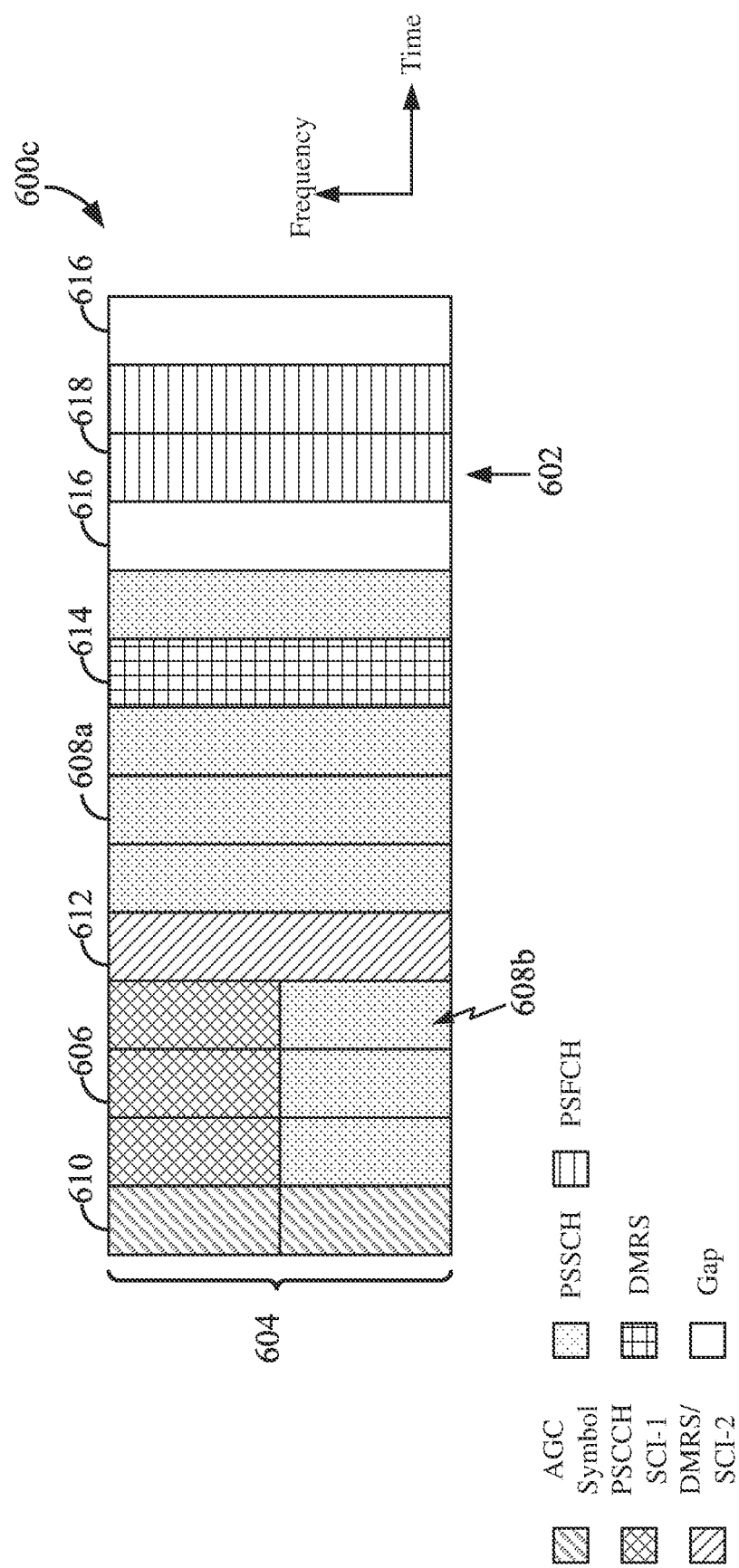
FIG. 6 is a diagram illustrating an example of a sidelink slot structure with feedback resources according to some aspects.

FIG. 6 is a diagram illustrating an example of a sidelink slot structure with feedback resources according to some aspects. The sidelink slot structure may be utilized, for example, in a V2X or other D2D network implementing sidelink. In the example shown in FIG. 6, time is in the horizontal direction with units of symbols 602 (e.g., OFDM symbols); and frequency is in the vertical direction. Here, a carrier bandwidth 604 allocated for sidelink wireless communication is illustrated along the frequency axis. A slot 600 having the slot structure shown in FIG. 6 includes fourteen symbols 602 that may be used for sidelink communication. However, it should be understood that sidelink communication can be configured to occupy fewer than fourteen symbols in a slot 600, and the disclosure is not limited to any particular number of symbols 602.

As in the examples shown in FIGS. 6A and 6B, the sidelink slot 600 includes a PSCCH 606 occupying a control region of the slot 600 and a PSSCH 608 occupying a data region 620 of the slot 600. The PSCCH 606 and PSSCH 608 are each transmitted on one or more symbols 602 of the slot 600a. The PSCCH 606 includes, for example, SCI-1 that schedules transmission of data traffic on time-frequency resources of the corresponding PSSCH 608. As shown in FIG. 6, the starting symbol for the PSCCH 606 is the second symbol of the slot 600 and the PSCCH 606 spans three symbols 602. The PSSCH 608 may be time-division multiplexed (TDMed) with the PSCCH 606 and/or frequency-division multiplexed (FDMed) with the PSCCH 606. In the example shown in FIG. 6, the PSSCH 608 includes a first portion 608a that is TDMed with the PSCCH 606 and a second portion 608b that is FDMed with the PSCCH 606.

The PSSCH 608 may further include a DMRSs 614 configured in a two, three, or four symbol DMRS pattern. For example, slot 600 shown in FIG. 6 illustrates a two symbol DMRS pattern. In some examples, the transmitting UE can select the DMRS pattern and indicate the selected DMRS pattern in SCI-1, according to channel conditions. The DMRS pattern may be selected, for example, based on the number of PSSCH 608 symbols in the slot 600. In addition, a gap symbol 616 is present after the PSSCH 608 in the slot 600.

The slot 600 further includes SCI-2 612 mapped to contiguous RBs in the PSSCH 608 starting from the first symbol containing a PSSCH DMRS. In the example shown in FIG. 6, the first symbol containing a PSSCH DMRS is the fifth symbol occurring immediately after the last symbol carrying the PSCCH 606. Therefore, the SCI-2 612 is mapped to RBs within the fifth symbol.

In addition, as shown in FIG. 6, the second symbol of the slot 600 is copied onto (repeated on) a first symbol 610 thereof for automatic gain control (AGC) settling. For example, in FIG. 6, the second symbol containing the PSCCH 606 FDMed with the PSSCH 608b may be transmitted on both the first symbol and the second symbol.

HARQ feedback may further be transmitted on a physical sidelink feedback channel (PSFCH) 618 in a configurable resource period of 0, 1, 2, or 4 slots. In sidelink slots (e.g., slot 600) containing the PSFCH 618, one symbol 602 may be allocated to the PSFCH 618, and the PSFCH 618 may be copied onto (repeated on) a previous symbol for AGC settling. In the example shown in FIG. 6, the PSFCH 618 is transmitted on the thirteenth symbol and copied onto the twelfth symbol in the slot 600c. A gap symbol 616 may further be placed after the PSFCH symbols 618.

In some examples, there is a mapping between the PSSCH 608 and the corresponding PSFCH resource. The mapping may be based on, for example, the starting sub-channel of the PSSCH 608, the slot containing the PSSCH 608, the source ID and the destination ID. In addition, the PSFCH can be enabled for unicast and groupcast communication. For unicast, the PSFCH may include one ACK/NACK bit. For groupcast, there may be two feedback modes for the PSFCH. In a first groupcast PSFCH mode, the receiving UE transmits only NACK, whereas in a second groupcast PSFCH mode, the receiving UE may transmit either ACK or NACK. The number of available PSFCH resources may be equal to or greater than the number of UEs in the second groupcast PSFCH mode.

A wireless device such as a UE may switch off (or switch off its radio frequency (RF) communication circuitry) periodically in order to conserve power. In an aspect, a discontinuous reception (DRX) mode may be defined such that a DRX cycle in the DRX mode has an ON duration during which the UE may be switched on for wireless communication and an OFF duration during which the UE may be switched off (e.g., by switching off its RF communication circuitry or the entire UE). The DRX cycle may be repeated during the DRX mode. In particular, the DRX mode may be defined by a start time of the DRX mode, a number of DRX cycles in the DRX mode, a DRX cycle length, and an ON duration for switching the UE on during the DRX cycle, and an offset from a reference time for starting the DRX mode. For example, when the DRX mode is implemented, the UE may be awake for only 10 milliseconds (msec) every 300 msec for a DRX cycle of 300 msec, where the DRX mode starts with a first instance of the DRX cycle after an offset from a reference time.

In a communication between a UE and a base station (e.g., via a Uu interface), the reference time for a DRX mode may be associated with a system frame number (SFN) timing and thus the offset from the reference time may be the offset in reference to a system frame. On the other hand, in a sidelink communication, one or more UEs may not have an SFN. For example, some UEs may not have an SFN if such UEs are not connected to a network. In an example, UEs that are synchronized to a global navigation satellite system (GNSS) time may utilize a direct frame number (DFN) timing as a reference time for a DRX mode, instead of relying on the SFN timing.

Hence, in a sidelink communication, for a particular time, different UEs may have different frame numbers and frame boundaries for frames respectively associated with SFNs (e.g., SFN values). In an example, UEs connected to different networks may have different SFNs at a particular time because such UEs may have different SFN timings from each other. Further, in an example, if different networks are synchronized to a GNSS time, the system frame boundaries (e.g., associated with SFNs) for the different networks may be aligned but their SFN values may be different at a particular time. Therefore, relying on an SFN timing to determine a DFN timing for a UE may result in different DFN timings for different UEs.

If each of two UEs are in a DRX mode, these UEs may communicate with each other (e.g., via sidelink) when an ON duration of a DRX cycle for one UE overlaps in time with an ON duration of a DRX cycle for the other UE. If different DFN timings are used by different UEs, then ON durations of DRX cycles for one UE may not overlap with ON durations of DRX cycles for another UE, and thus sidelink communication between these UEs may not be possible. For example, this issue may occur when one UE is synchronized to a network (e.g., by being connected to the network), and another UE is synchronized to a GNSS time (e.g., while not being connected to a network) or to a different network. Hence, to allow UEs to communicate via sidelink during DRX modes, the UEs may be configured to have the same or substantially overlapping DRX cycles (e.g., ON durations of the DRX cycles), regardless of whether each UE is connected to a network and/or regardless of which network each UE is connected to.

Figure 7:
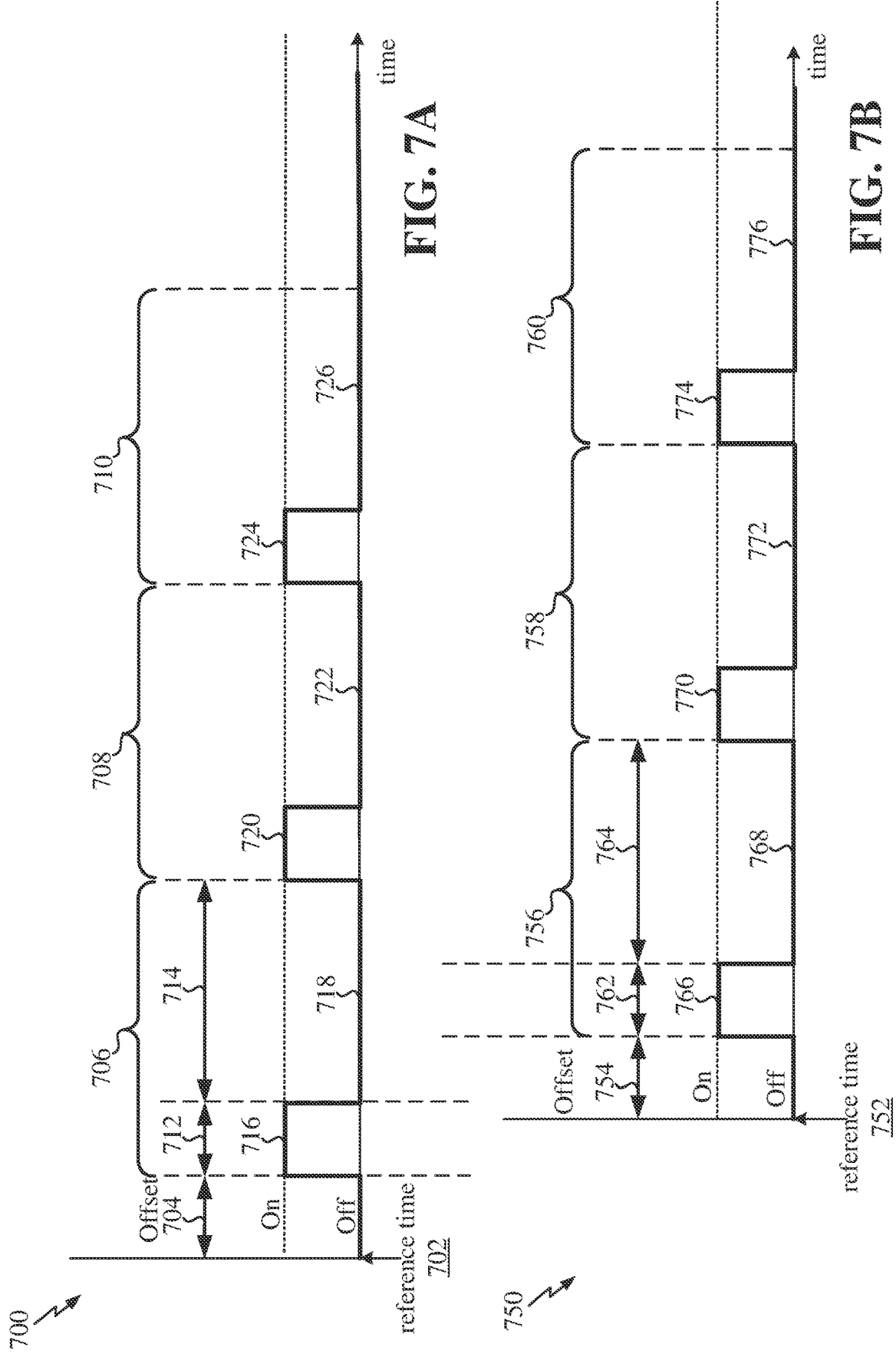
FIGS. 7A and 7B are example diagrams illustrating timings of two DRX modes by different UEs, according to some aspects.

FIGS. 7A and 7B are example diagrams illustrating timings of two DRX modes by different UEs, according to some aspects. FIG. 7A is an example diagram 700 illustrating an exemplary DRX mode, according to some aspects. The DRX mode in FIG. 7A includes DRX cycles 706, 708, and 710, and starts after an offset duration 704 from a reference time 702. FIG. 7A also shows an ON duration 716 of the DRX cycle 706 and an OFF duration 718 of the DRX cycle 706, an ON duration 720 of the DRX cycle 708 and an OFF duration 722 of the DRX cycle 708, and an ON duration 724 of the DRX cycle 710 and an OFF duration 726 of the DRX cycle 710. For example, with reference to DRX cycle 706, the duration of the DRX cycle 706 may be 300 msec, the duration 712 of the ON duration may be 10 msec and the duration 714 of the OFF duration may be 290 msec. A DRX cycle duration of a DRX cycle may be a combined duration of the ON duration and the OFF duration. For example, a DRX cycle duration of the DRX cycle 706 is a sum of the duration 712 of the ON duration and the duration 714 of the OFF duration.

FIG. 7B is an example diagram 750 illustrating an exemplary DRX mode, according to some aspects. The DRX mode in FIG. 7B includes DRX cycles 756, 758, and 760, and starts after an offset duration 754 from a reference time 752. FIG. 7B further shows an ON duration 766 of the DRX cycle 756 and an OFF duration 768 of the DRX cycle 756, an ON duration 770 of the DRX cycle 758 and an OFF duration 772 of the DRX cycle 758, and an ON duration of 774 the DRX cycle 760 and an OFF duration 776 of the DRX cycle 760. For example, with reference to DRX cycle 756, the duration of the DRX cycle 756 may be 300 msec, the duration 762 of the ON duration may be 10 msec and the duration 764 of the OFF duration may be 290 msec. A DRX cycle duration of a DRX cycle may be a combined duration of the ON duration and the OFF duration. For example, a DRX cycle duration of the DRX cycle 756 is a combined duration of the duration 762 of the ON duration and the duration 764 of the OFF duration.

The reference time 702 for a first UE in FIG. 7A is significantly different from the reference time 752 for a second UE in FIG. 7B. For example, this difference in the reference times may be due to the UEs not utilizing the same SFN timing or the same DFN timing. Hence, the ON durations of the DRX cycles 706, 708, and 710 for the first UE in FIG. 7A do not overlap with the ON durations of the DRX cycles 756, 758, and 760 for the second UE in FIG. 7B. Therefore, during the DRX modes, the first UE and the second UE cannot communicate with each other via sidelink.

According to some aspects of the disclosure, a UE may configure a sidelink DRX mode using one or more sidelink DRX parameters based on a DFN timing, such that the UE may perform a sidelink communication with a second UE during an ON duration of the sidelink DRX cycle according to the one or more sidelink DRX parameters determined based on the DFN timing. Hence, instead of relying on an SFN timing, the UE may rely on the DFN timing to implement the sidelink DRX mode. In an aspect, the second UE may also rely on the DFN timing to implement the sidelink DRX mode. For example, relying on the DFN timing to implement the sidelink DRX mode is advantageous in that the DFN timing may be substantially the same across different UEs, regardless of whether each UE is connected to a network (e.g., in network coverage) and/or regardless of which network each UE is connected to.

In an aspect, the sidelink DRX parameter(s) may include at least one of: the ON duration of the sidelink DRX cycle, an offset duration indicating a delay between a reference time for starting the sidelink DRX mode and a first instance of a DRX cycle, a DRX cycle duration, or a number of DRX cycles for the sidelink DRX mode. For example, referring back to FIG. 7A, the UE may configure the DRX mode using the sidelink DRX parameter(s) including the ON duration, the offset duration, the DRX cycle duration, and the number of DRX cycles, to respectively determine the ON duration 716, the offset duration 704, a duration of each of the DRX cycles 706, 708, and 710, and the number of DRX cycles being three. In an aspect, the sidelink DRX parameter(s) may further include an inactivity timer, which may be used to determine the amount of time that the UE remains ON after receiving a signal (e.g., during the on-duration).

In an aspect, the offset duration indicating the delay between the reference time for starting the sidelink DRX mode and the first instance of the DRX cycle may be based on a DFN value corresponding to the DFN timing, a subframe number of a subframe associated with the DFN value, and the duration of the sidelink DRX cycle. The DFN value may correspond to a direct frame that is used for SL transmissions for the sidelink DRX cycle. In an example, the DFN value may correspond to a first direct frame for a first sidelink DRX cycle. The subframe number may correspond to a subframe within the direct frame of the DFN value. In an example, the subframe number may correspond to the subframe where the sidelink DRX cycle is initiated. For example, the DFN value may range from 0 to 1023 and the subframe number may range from 0-9, as each DFN includes 10 subframes with each subframe having a 1 msec duration. In an example, the base station may transmit, and the UE may receive, the DFN value via a PBCH.

In an aspect, the offset duration may be calculated based on a remainder from dividing a sum of the subframe number and a product of the DFN value and 10 by the duration of the sidelink DRX cycle. For example, the offset duration may be determined based on the following Equation (1):

$$sl\text{-}drx\text{-StartOfset}=[(DFN\times10)+\text{subframe number}] \bmod(sl\text{-}drx\text{-Cycle}), \quad (1)$$

where the sl-drx-StartOffset is the offset duration, the DFN is the DFN value, the subframe number is the subframe number of the subframe associated with the DFN value, and sl-drx-Cycle is the duration of the sidelink DRX cycle.

In an aspect, the UE may determine the DFN timing. In this aspect, the UE may determine a GNSS time, and determine the DFN timing based on the GNSS time. For example, the GNSS time may be determined by a GPS device in the UE or connected to the UE. For example, regardless of whether a UE is in network coverage or out of network coverage, the DFN timing or the DFN value corresponding to the DFN timing may be derived based on a coordinated universal time (UTC) provided by a GNSS (e.g., GNSS timing). In an example where a UE is in network coverage but and is using a GNSS as a synchronization source for SL communication, the DFN value may be derived from the GNSS timing and a timing offset with respect to cell timing reference (e.g., reference time for a cell serving the UE). In an example where the UE is in network coverage and is not using the GNSS for synchronization, the DFN value may be derived based on the SFN value, where the SFN value provides an indexing of the frames based on the cell timing reference.

In another aspect, the UE may receive a DFN indicator from a base station, and determine the DFN timing based on the DFN indicator. In an aspect, the base station may determine the DFN indicator, and transmit the DFN indicator to the UE. The UE may determine the DFN timing based on the DFN indicator and then determine the sidelink DRX mode using the sidelink DRX parameter(s) based on the DFN indicator. The DFN indicator may be transmitted via system information block (SIB), a radio resource control (RRC) message, a physical broadcast channel (PBCH), and/or a medium access control control element (MAC-CE).

For example, in some cases, if the UE does not have a reliable GPS reception in certain locations (e.g., urban setting with tall buildings) or has a GPS device unavailable or turned off, the UE may not be able to determine the GNSS time on its own to determine the DFN timing. In these cases, the UE may receive the DFN indicator from the base station to determine the DFN timing based on the DFN indicator.

In an aspect, the DFN indicator may include one or more of: an offset value indicative of a difference between the DFN timing and an SFN timing associated with the base station, the DFN timing, and the GNSS time. The offset value indicative of the difference between the DFN timing and the SFN timing may be a time difference between the DFN timing and the SFN timing, or it may be a frame number difference between the DFN timing and the SFN timing.

In an aspect, the offset value indicative of the difference between the DFN timing and an SFN timing and/or the DFN timing may be based on the GNSS time. In an aspect, the offset value and/or the DFN timing may be determined by the base station based on the GNSS time. In an example, the base station may determine the offset value based on the GNSS time and transmit the offset value to the UE. In an aspect, the offset value may be expressed in a number of frame offsets or in an offset time. In an example, if the offset value indicates 10 msec, then the UE may apply the offset of +10 msec to the SFN timing to determine the DFN timing. In another example, if the offset value indicates −5 msec, then the UE may apply the offset of −5 msec to the SFN timing to determine the DFN timing. In an example, if the offset value indicates 3 frames, then the UE may determine that the DFN timing is +3 frames offset from the SFN timing. In another example, if the offset value indicates −2 frames, then the UE may determine that the DFN timing is −2 frames offset from the SFN timing. In an example, the base station may determine the offset value based on the GNSS time, determine the DFN timing based on the offset value, and then transmit the DFN timing to the UE.

Figure 8:
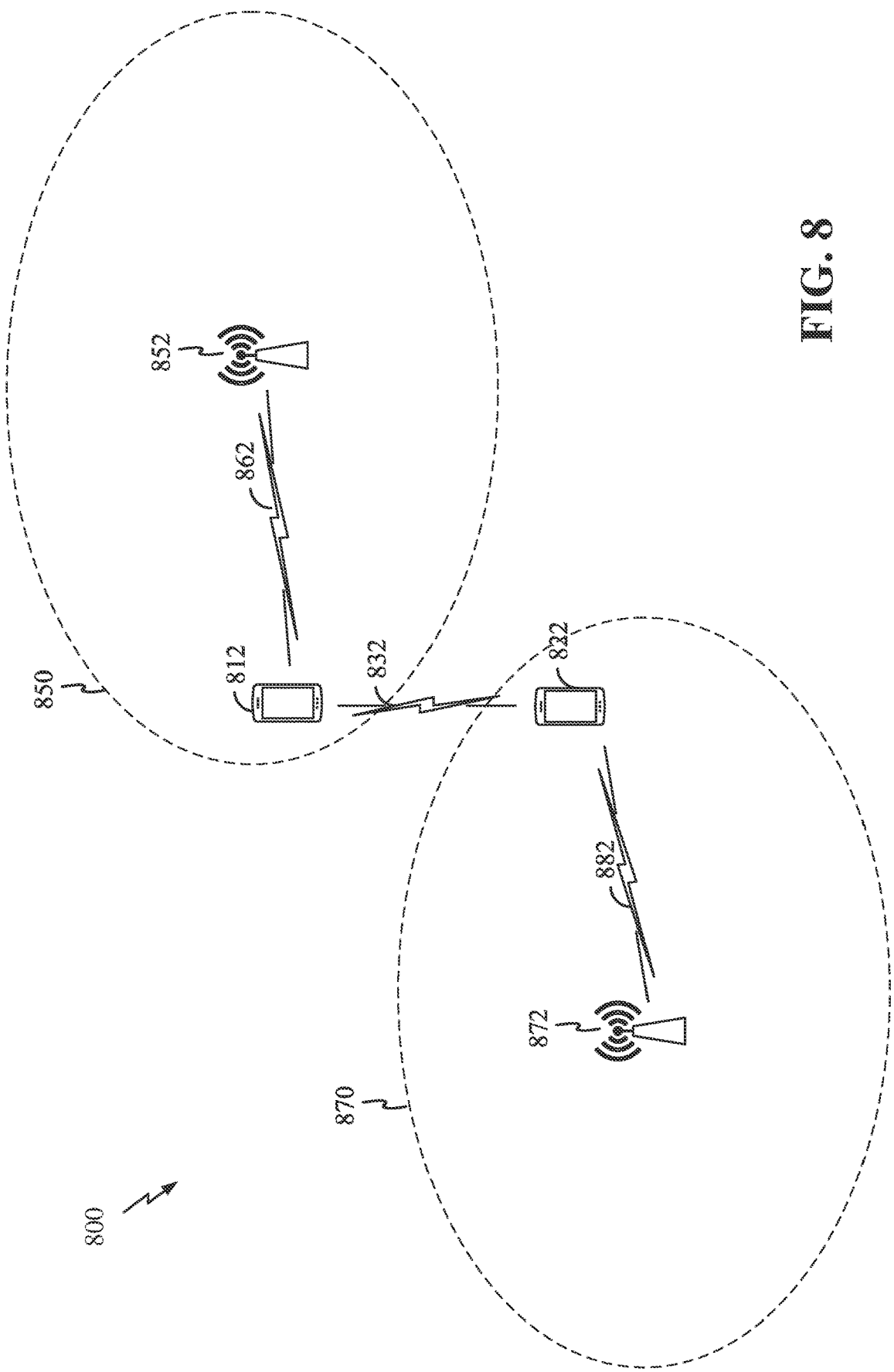
FIG. 8 is an example diagram illustrating interactions between UEs and possible interactions of the UEs with respective base stations, according to some aspects.

FIG. 8 is an example diagram 800 illustrating interactions between UEs and possible interactions of the UEs with respective base stations, according to some aspects. In FIG. 8, a first UE 812 and a second UE 822 may perform a sidelink communication directly with each other via a sidelink 832. As discussed above, in an aspect, the first UE 812 may determine one or more first sidelink DRX parameters for a first sidelink DRX cycle for the first UE 812, and for the sidelink 832, based on a first DFN timing. The first UE 812 may then perform a sidelink communication with the second UE 822 during an ON duration of a first sidelink DRX cycle in the first sidelink DRX mode according to the first sidelink DRX parameter(s). In an aspect, in FIG. 8, the first UE 812 may be connected to a first network 850 operated by a first base station 852, and may communicate with the first base station 852 via a first Uu interface 862. In an aspect, the first UE 812 may determine the first DFN timing (e.g., based on a GNSS time acquired by the first UE 812). In an aspect, the first UE 812 may receive a first DFN indicator from the first base station 852, and then determine the first DFN timing based on the first DFN indicator, to configure the first sidelink DRX mode based on the first DFN timing.

In an aspect, the second UE 822 may configure a second sidelink DRX mode using one or more second sidelink DRX parameters for the second UE 822 and the sidelink 832, based on a second DFN timing. The second UE 822 may then perform a sidelink communication with the first UE 812 during an ON duration of a second sidelink DRX cycle in the second sidelink DRX mode according to the second sidelink DRX parameter(s). In one aspect (not shown in FIG. 8), the second UE 822 may not be connected to a network operated by a base station. In another aspect, in FIG. 8, the second UE 822 may be connected to a second network 870 operated by a second base station 872, and may communicate with the second base station 872 via a second Uu interface 882. In an aspect, the second UE 822 may determine the second DFN timing (e.g., based on a GNSS time acquired by the second UE 822). In an aspect, the second UE 822 may receive a second DFN indicator from the first base station 852, and then determine the first DFN timing based on the second DFN indicator, to configure the second sidelink DRX mode based on the second DFN timing.

The first DFN timing determined by the first UE 812 may correspond or substantially correspond to the second DFN timing determined by the second UE 822, such that direct frames based on the first DFN timing at least substantially overlap (e.g., with an at least 50% overlap) with direct frames based on the second DFN timing. For example, if a first direct frame (e.g., DFN 0) based on the second DFN timing overlaps with at least 50% of a first direct frame (e.g., DFN 0) based on the first DFN timing, the second DFN timing may be determined to be substantially overlapping with the first DFN timing. For example, the first DFN timing and the second DFN timing may be determined based on the GNSS time or respective DFN indicators that are based on the GNSS time. The GNSS time may be the same throughout different devices, and thus the first DFN timing may correspond or substantially correspond to the second DFN timing, as the first DFN timing and the second DFN timing are based on the GNSS time or respective DFN indicators based on the GNSS time. If the first DFN timing corresponds or substantially corresponds to the second DFN timing, the first sidelink DRX mode configured based on the first DFN timing corresponds or substantially corresponds to the second sidelink DRX mode configured based on the second DFN timing. Therefore, the ON duration of the first sidelink DRX cycle for the first UE 812 may completely or substantially overlap with the ON duration of the second sidelink DRX cycle for the second UE 822.

In an aspect, the base station may transmit to the UE a GNSS synchronization indicator indicating whether the base station is synchronized to a GNSS time. When the UE receives the GNSS synchronization indicator from the base station, the UE may perform the sidelink communication further based on the GNSS synchronization indicator. For example, if the base station is synchronized to the GNSS time, then boundaries of direct frames determined based on the GNSS time (e.g., GNSS-based direct frames) may align with boundaries of system frames having respective SFNs. Therefore, if the base station is synchronized to the GNSS time, the DFN timing determined based on the SFN timing (e.g., using the offset value) associated with the base station may cause boundaries of direct frames based on the DFN timing to be aligned with boundaries of GNSS-based direct frames. On the other hand, if the base station is not synchronized to the GNSS time, then boundaries of GNSS-based direct frames may not align with boundaries of system frames. Hence, if the base station is not synchronized to the GNSS time, the DFN timing determined based on the SFN timing (e.g., using the offset value) associated with the base station may cause boundaries of direct frames based on the DFN timing not to be aligned with boundaries of the GNSS-based direct frames.

In an aspect, if the GNSS synchronization indicator from the base station indicates that the base station is not synchronized to the GNSS time, the UE may refrain from transmitting the sidelink communication to the second UE during at least a portion of a first frame corresponding to a first DFN based on the DFN timing and/or at least a portion of a last frame corresponding to a last DFN based on the DFN timing. For example, refraining from transmitting during at least a portion of the first frame and/or at least a portion of the last frame may be beneficial because the frame boundaries of direct frames based on the SFN timing may not be aligned with the boundaries of the GNSS-based direct frames if the base station is not synchronized to the GNSS time. On the other hand, if the GNSS synchronization indicator indicates that the base station is synchronized to the GNSS time, the UE may utilize the first frame and/or the last frame to transmit the sidelink communication to the second UE.

FIG. 9A is an example diagram 900 illustrating direct frames based on a DFN timing determined based on an SFN timing, system frames, and GNSS-based direct frames when the base station is synchronized to the GNSS time, according to some aspects. In the example of FIG. 9A, because the base station is synchronized to the GNSS time, frame boundaries of GNSS-based direct frames 910 are aligned with frame boundaries of system frames 920 associated with the base station. Hence, in FIG. 9A, a DFN timing determined based on an SFN timing associated with the system frames 920 may cause the frame boundaries of direct frames 930 based on the SFN timing (e.g., using the offset value) to align with boundaries of the GNSS-based direct frames 910. In FIG. 9A, the offset value indicative of a difference between the DFN timing and the SFN timing associated with the base station is 3 frames. Hence, the SFN 3 may correspond to the DFN 0, for example.

FIG. 9B is an example diagram 950 illustrating direct frames based on a DFN timing determined based on an SFN timing, system frames, and GNSS-based direct frames when the base station is not synchronized to the GNSS time, according to some aspects. In the example of FIG. 9B, because the base station is not synchronized to the GNSS time, frame boundaries of GNSS-based direct frames 960 are not aligned with frame boundaries of system frames 970 associated with the base station. Hence, in FIG. 9B, a DFN timing determined based on an SFN timing associated with the system frames 970 may cause the frame boundaries of direct frames 980 based on the SFN timing (e.g., using the offset value) not to completely align with boundaries of the GNSS-based direct frames 960. As shown in FIG. 9B, the direct frames 980 based on the SFN timing start slightly later than the GNSS-based direct frames 960, although the DFN 0 and the DFN 1 of the direct frames 980 based on the SFN timing substantially overlaps the DFN 0 and the DFN 1 of the GNSS-based direct frames 960, respectively. In FIG. 9B, the offset value indicative of a difference between the DFN timing and the SFN timing associated with the base station is 3 frames. Hence, the SFN 3 may correspond to the DFN 0, for example.

Figure 10A:
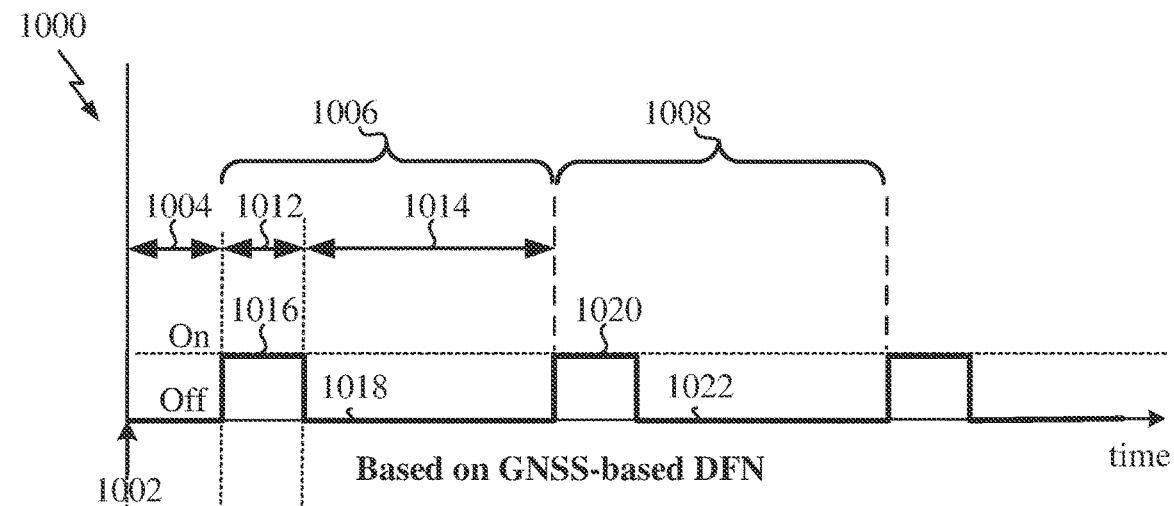
FIGS. 10A, 10B, 10C are example diagrams illustrating three DRX modes based on three DFN timings, according to some aspects.
Figure 10B:
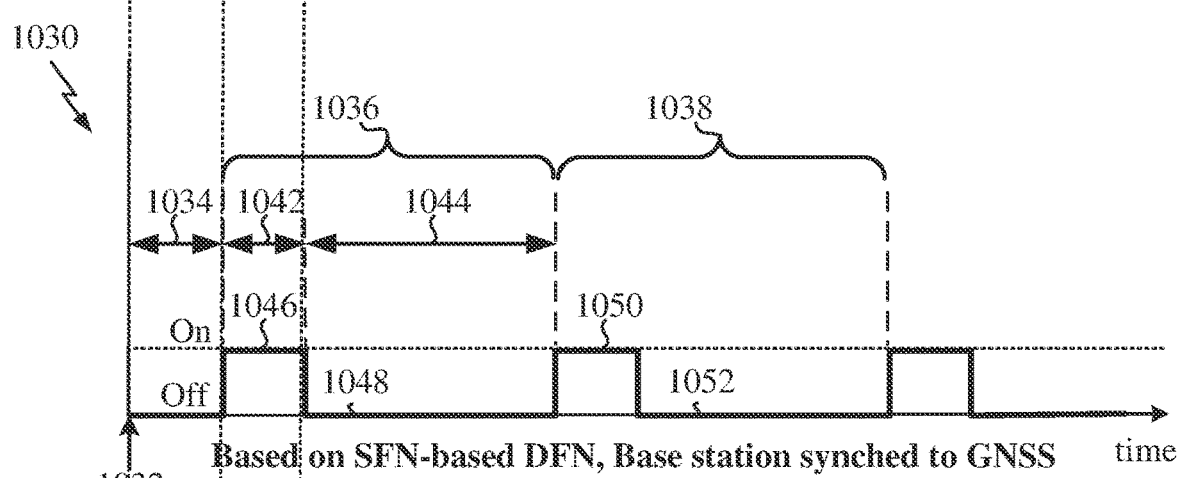
Figure 10C:
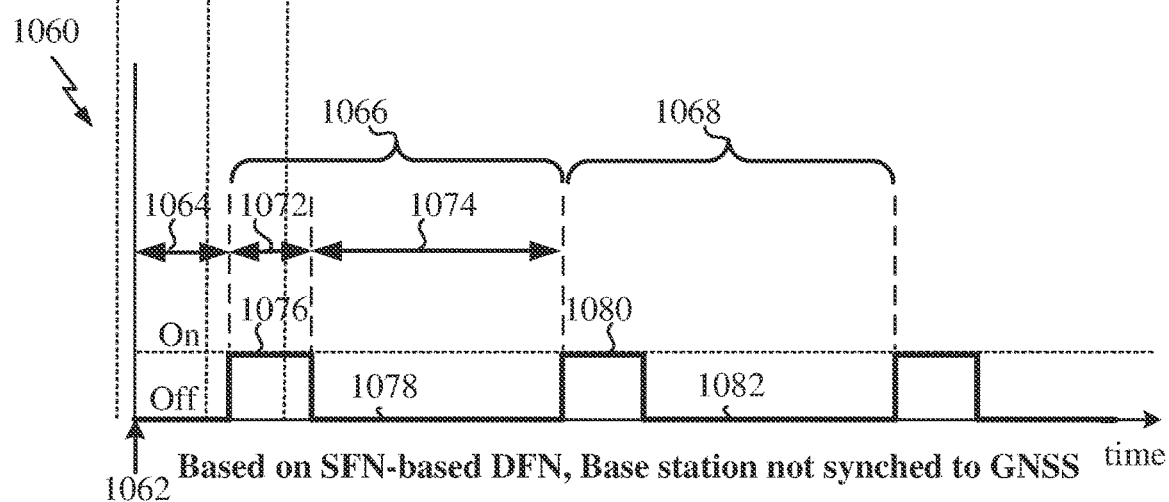

FIGS. 10A-10C are example diagrams illustrating three DRX modes based on three DFN timings, according to some aspects. FIG. 10A is an example diagram 1000 illustrating an exemplary DRX mode that is configured based on a GNSS-based DFN timing, according to some aspects. For example, the DRX mode of the example diagram 1000 may correspond to the GNSS-based DFN timing of the GNSS-based direct frames 910 of FIG. 9A or the GNSS-based direct frames 960 of FIG. 9B. The DRX mode in FIG. 10A includes DRX cycles such as the DRX cycles 1006 and 1008, and starts after an offset duration 1004 from a reference time 1002 that is based on the GNSS-based DFN timing. FIG. 10A shows an ON duration 1016 of the DRX cycle 1006 with an ON duration length 1012 and an OFF duration 1018 of the DRX cycle 1006 with an OFF duration length 1014. Similarly, FIG. 10A further shows an ON duration 1020 of the DRX cycle 1008 and an OFF duration 1022 of the DRX cycle 1008. In an aspect, the offset duration 1004 may be calculated based on the Equation (1) discussed above, where the DFN value may correspond to a first direct frame in the DRX cycle 1006, the subframe number may correspond to a subframe where the DRX cycle 1006 starts within the first direct frame in the DRX cycle 1006, and the duration of the sidelink DRX cycle may correspond to a duration of the DRX cycle 1006.

FIG. 10B is an example diagram 1030 illustrating an exemplary DRX mode that is configured based on a DFN timing that is determined based on an SFN timing when a base station is synchronized to a GNSS time, according to some aspects. For example, the DRX mode of the example diagram 1030 may correspond to the DFN timing of the direct frames 930 of FIG. 9A when the base station is synchronized to the GNSS time. The DRX mode in FIG. 10B includes DRX cycles such as the DRX cycles 1036 and 1038, and starts after an offset duration 1034 from a reference time 1032 that is based on the DFN timing determined based on the SFN timing. FIG. 10B shows an ON duration 1046 of the DRX cycle 1036 with an ON duration length 1042 and an OFF duration 1048 of the DRX cycle 1036 with an OFF duration length 1044. Similarly, FIG. 10B further shows an ON duration 1050 of the DRX cycle 1038 and an OFF duration 1052 of the DRX cycle 1038. Because the base station is synchronized to the GNSS time in FIG. 10B, the DFN timing based on the SFN timing and used to configure the exemplary DRX mode in FIG. 10B is the same as the DFN timing based on the GNSS and used to configure the exemplary DRX mode in FIG. 10A. Thus, the exemplary DRX mode (or at least the ON duration 1016 of the DRX cycle 1006) in FIG. 10A may completely (or substantially) overlap with the exemplary DRX mode (or at least the ON duration 1046 of the DRX cycle 1036) in FIG. 10B. In an aspect, the offset duration 1034 may be calculated based on the Equation (1) discussed above, where the DFN value may correspond to a first direct frame in the DRX cycle 1036, the subframe number may correspond to a subframe within the first direct frame in the DRX cycle 1036 where the DRX cycle 1036 starts, and the duration of the sidelink DRX cycle may correspond to a duration of the DRX cycle 1036.

FIG. 10C is an example diagram 1060 illustrating an exemplary DRX mode that is configured based on a DFN timing that is determined based on an SFN timing when a base station is not synchronized to a GNSS time, according to some aspects. For example, the DRX mode of the example diagram 1060 may correspond to the DFN timing of the direct frames 980 of FIG. 9B when the base station is not synchronized to the GNSS time. The DRX mode in FIG. 10C includes DRX cycles such as the DRX cycles 1066 and 1068, and starts after an offset duration 1064 from a reference time 1062 that is based on the DFN timing that is determined based on the SFN timing. FIG. 10C shows an ON duration 1076 of the DRX cycle 1066 with an ON duration length 1072 and an OFF duration 1078 of the DRX cycle 1066 with an OFF duration length 1074. Similarly, FIG. 10C further shows an ON duration 1080 of the DRX cycle 1068 and an OFF duration 1082 of the DRX cycle 1068. Because the base station is not synchronized to the GNSS time in FIG. 10C, the DFN timing used to configure the exemplary DRX mode in FIG. 10C is not completely the same as or is not similar to the DFN timing used to configure the exemplary DRX mode in FIG. 10A. Thus, the exemplary DRX mode (or at least the ON duration 1016 of the DRX cycle 1006) in FIG. 10A does not substantially overlap with the exemplary DRX mode (or at least the ON duration 1076 of the DRX cycle 1036) in FIG. 10C. The timing of the exemplary DRX mode in FIG. 10C may not be substantially aligned with the timing of the exemplary DRX mode in FIG. 10A, although the ON durations of these two DRX modes substantially overlap with each other. In an aspect, the offset duration 1064 may be calculated based on the Equation (1) discussed above, where the DFN value may correspond to a first direct frame in the DRX cycle 1066, the subframe number may correspond to a subframe within the first direct frame in the DRX cycle 1066 where the DRX cycle 1066 starts, and the duration of the sidelink DRX cycle may correspond to a duration of the DRX cycle 1066.

In an aspect, if the boundaries of system frames are not aligned with the boundaries of the GNSS-based direct frames, the UE may not utilize, for a sidelink transmission, at least a portion of a first frame corresponding to a first DFN based on the DFN timing and/or at least a portion of a last frame corresponding to a last DFN based on the DFN timing. As discussed above, for example, the boundaries of the system frames may not be aligned with the boundaries of the GNSS-based direct frames if the base station is not synchronized to the GNSS time. For example, if the boundaries of system frames are not aligned with the boundaries of the GNSS-based direct frames, the frame boundaries of direct frames based on the SFN timing may also not be aligned with the boundaries of the GNSS-based direct frames. Hence, it may be beneficial to skip utilizing a first portion of the direct frames and/or a last portion of the direct frames for a sidelink transmission when the direct frames are based on such an SFN timing. On the other hand, even if the boundaries of system frames are not aligned with the boundaries of the GNSS-based direct frames, the UE may still receive a sidelink communication or monitor for a sidelink communication on the first frame corresponding to the first DFN and/or the last frame corresponding to the last DFN.

FIG. 11A is an example diagram 1100 illustrating direct frames based on a DFN timing determined based on an SFN timing, system frames, and GNSS-based direct frames when the base station is not synchronized to the GNSS time, according to some aspects. In the example of FIG. 11A, because the base station is not synchronized to the GNSS time, frame boundaries of GNSS-based direct frames 1110 are not aligned with frame boundaries of system frames 1120 associated with the base station. Hence, in FIG. 11A, a DFN timing determined based on an SFN timing associated with the system frames 1120 may cause the frame boundaries of direct frames 1130 based on the SFN timing (e.g., using the offset value) not to align with boundaries of the GNSS-based direct frames 1110. As shown in FIG. 11B, the direct frames 1130 based on the SFN timing start slightly later than the GNSS-based direct frames 1110, although the DFN 0, 1, . . . n of the direct frames 1130 based on the SFN timing substantially overlaps the DFN 0, 1, . . . n of the GNSS-based direct frames 1110, respectively. In FIG. 11A, a last portion 1140 of the DFN n of the direct frames 1130 does not overlap with any of the direct frames of the GNSS-based direct frames 1110, and thus, in an aspect, the UE may refrain from transmitting a sidelink communication during the last portion 1140 of the DFN n of the direct frames 1130.

FIG. 11B is an example diagram 1150 illustrating direct frames based on a DFN timing determined based on an SFN timing, system frames, and GNSS-based direct frames when the base station is not synchronized to the GNSS time, according to some aspects. In the example of FIG. 11B, because the base station is not synchronized to the GNSS time, frame boundaries of GNSS-based direct frames 1160 are not aligned with frame boundaries of system frames 1170 associated with the base station. Hence, in FIG. 11B, a DFN timing determined based on an SFN timing associated with the system frames 1170 may cause the frame boundaries of direct frames 1180 based on the SFN timing (e.g., using the offset value) not to align with boundaries of the GNSS-based direct frames 1160. As shown in FIG. 11B, the direct frames 1180 based on the SFN timing start slightly before the GNSS-based direct frames 1160, although the DFN 0, 1, . . . n of the direct frames 1180 based on the SFN timing substantially overlaps the DFN 0, 1, . . . n of the GNSS-based direct frames 1160, respectively. In FIG. 11B, a first portion 1190 of the DFN 0 of the direct frames 1180 does not overlap with any of the direct frames of the GNSS-based direct frames 1160, and thus, in an aspect, the UE may refrain from transmitting a sidelink communication during the first portion 1190 of the DFN 0 of the direct frames 1180.

In an aspect, the base station may transmit to the UE a skip indicator indicating to refrain utilizing the sidelink communication for at least a portion of a first frame corresponding to a first DFN based on the DFN timing and/or at least a portion of a last frame corresponding to a last DFN based on the DFN timing. When the UE receives the skip indicator, the UE may refrain from transmitting the sidelink communication to the second UE during the at least the portion of the first frame and/or the at least the portion of the last frame based on the skip indicator. In an aspect, the base station may transmit the skip indicator to the UE when the base station determines that the base station is not synchronized to the GNSS time.

In an aspect, the skip indicator may include a first number of slots in the first frame to be skipped for the sidelink communication and/or a second number of slots in the last frame to be skipped for the sidelink communication. For example, according to the skip indicator, the UE may skip a first several slots in the first frame for transmitting the sidelink communication and/or may skip a last several slots in the last frame for transmitting the sidelink communication.

Figure 12:
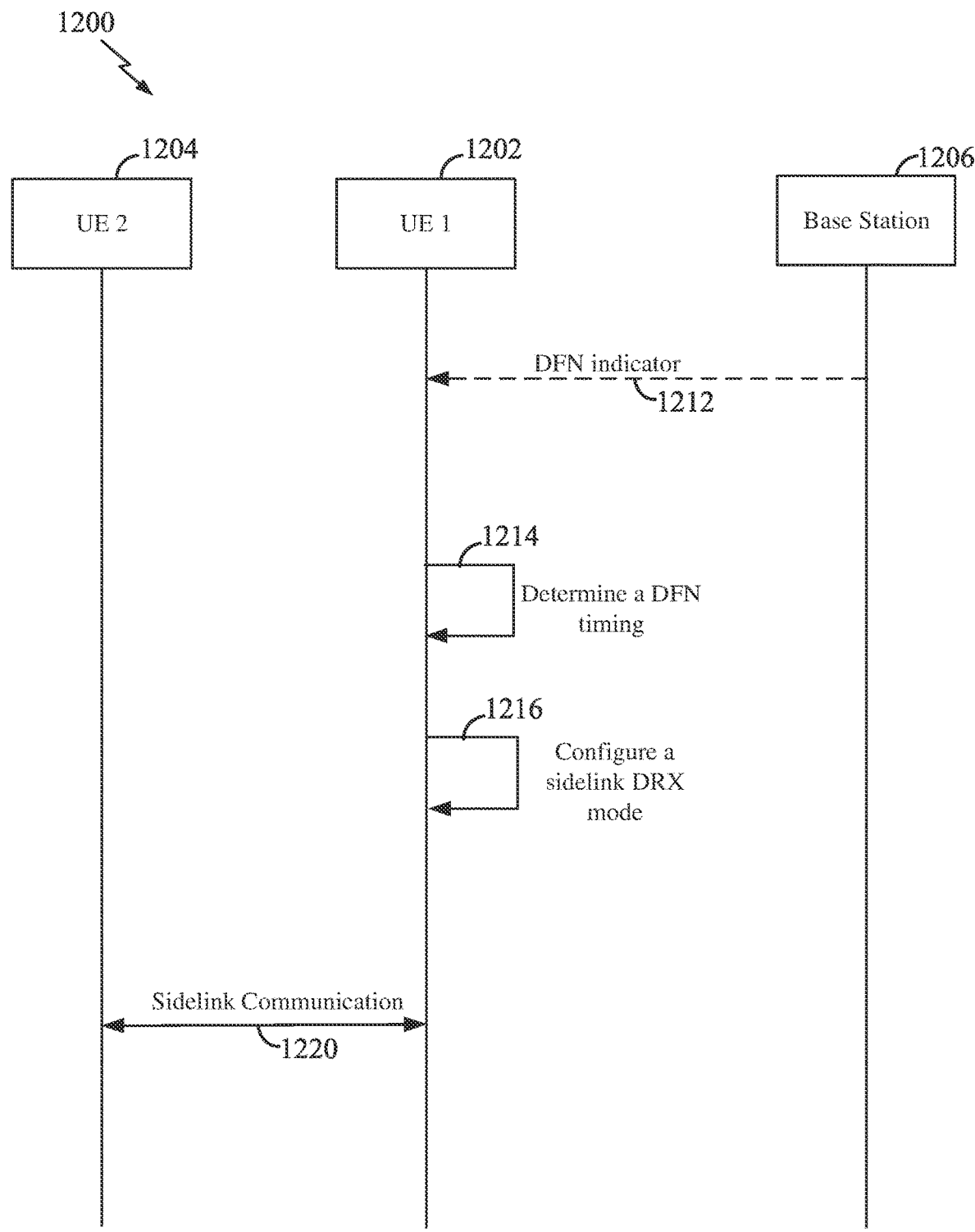
FIG. 12 is an example flow diagram illustrating interactions between a first UE, a second UE, and a base station, according to some aspects.

FIG. 12 is an example flow diagram 1200 illustrating interactions between a first UE 1202, a second UE 1204, and a base station 1206, according to some aspects. In FIG. 12, in an aspect, at 1212, the base station 1206 may determine and transmit a DFN indicator to the first UE 1202, where the DFN indicator may include one or more of: an offset value indicative of a difference between the DFN timing and an SFN timing associated with the base station, the DFN timing, and the GNSS time. In this aspect, at 1214, the first UE 1202 may determine the DFN timing based on the DFN indicator. In another aspect, at 1214, the first UE 1202 may determine the DFN timing on its own without receiving the DFN indicator or relying on the DFN indicator. For example, the first UE 1202 may determine a GNSS time and may determine the DFN timing based on the GNSS time. At 1216, the first UE 1202 may configure a sidelink DRX mode using one or more sidelink DRX parameters based on the DFN timing. At 1220, the first UE 1202 may perform a sidelink communication with the second UE 1204 during an on-duration of a sidelink DRX cycle in the sidelink DRX mode according to the one or more sidelink DRX parameters.

Figure 13:
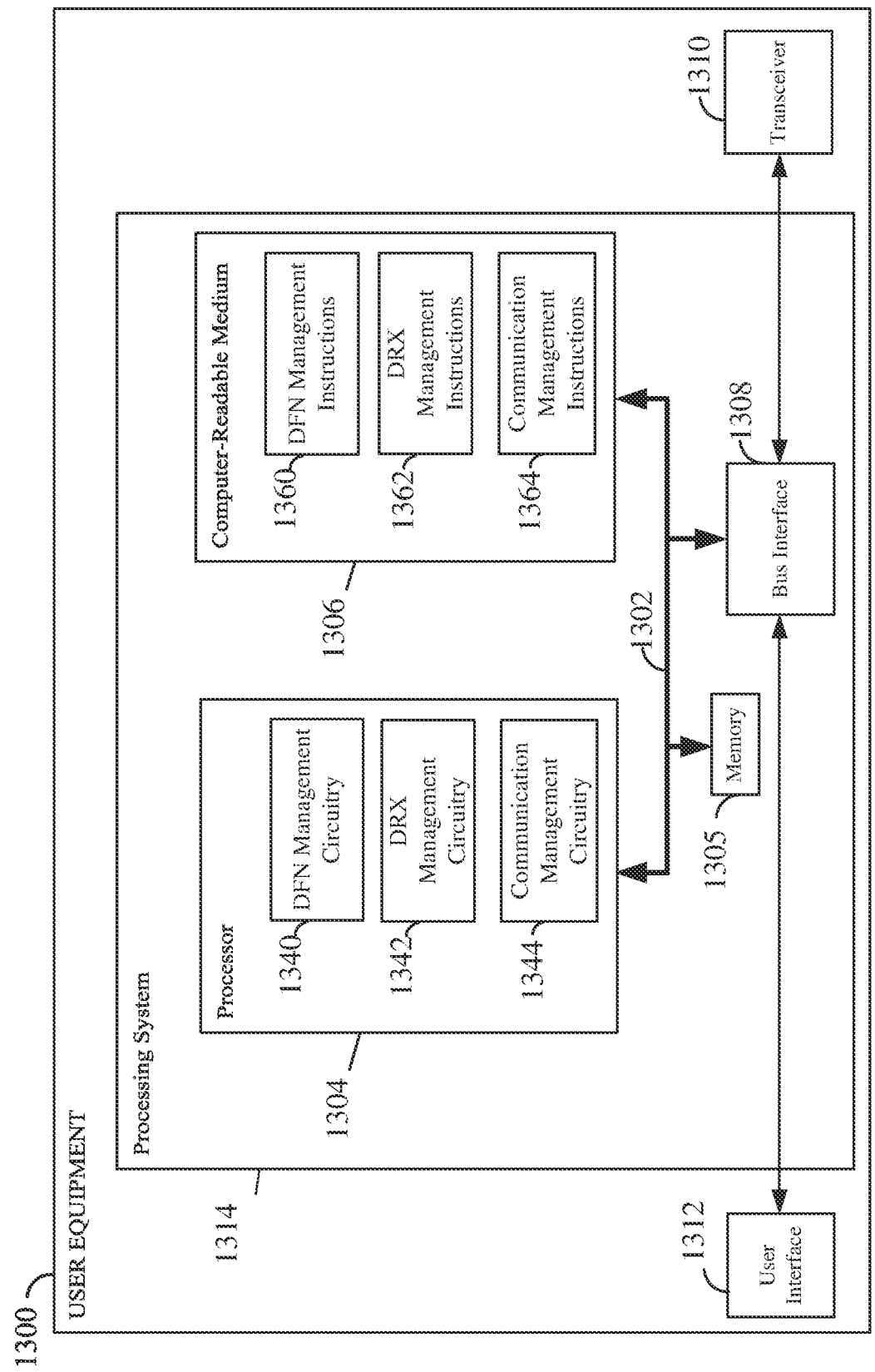
FIG. 13 is a block diagram conceptually illustrating an example of a hardware implementation for a user equipment according to some aspects.

FIG. 13 is a block diagram illustrating an example of a hardware implementation for a UE 1300 employing a processing system 1314. For example, the UE 1300 may be a user equipment (UE) as illustrated in any one or more of FIGS. 1, 2, and/or 3.

The UE 1300 may be implemented with a processing system 1314 that includes one or more processors 1304.

Examples of processors 1304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1300 may be configured to perform any one or more of the functions described herein. That is, the processor 1304, as utilized in a UE 1300, may be used to implement any one or more of the processes and procedures described below and illustrated in FIGS. 14-15.

In this example, the processing system 1314 may be implemented with a bus architecture, represented generally by the bus 1302. The bus 1302 may include any number of interconnecting buses and bridges depending on the specific application of the processing system 1314 and the overall design constraints. The bus 1302 communicatively couples together various circuits including one or more processors (represented generally by the processor 1304), a memory 1305, and computer-readable media (represented generally by the computer-readable storage medium 1306). The bus 1302 may also link various other circuits such as timing sources, peripherals, voltage regulators, and power management circuits, which are well known in the art, and therefore, will not be described any further. A bus interface 1308 provides an interface between the bus 1302 and a transceiver 1310. The transceiver 1310 provides a communication interface or means for communicating with various other apparatus over a transmission medium. Depending upon the nature of the apparatus, a user interface 1312 (e.g., keypad, display, speaker, microphone, joystick) may also be provided. Of course, such a user interface 1312 is optional, and may be omitted in some examples, such as a base station.

In some aspects of the disclosure, the processor 1304 may include DFN management circuitry 1340 configured for various functions, including, for example, determining a DFN timing. For example, the DFN management circuitry 1340 may be configured to implement one or more of the functions described below in relation to FIGS. 14 and 15, including, e.g., blocks 1402 and 1508.

In some aspects, the DFN management circuitry 1340 may be configured for various functions, including, for example, receiving a DFN indicator from a base station. For example, the DFN management circuitry 1340 may be configured to implement one or more of the functions described below in relation to FIG. 15, including, e.g., block 1502.

In some aspects, the DFN management circuitry 1340 may be configured for various functions, including, for example, determining a global navigation satellite system (GNSS) time. For example, the DFN management circuitry 1340 may be configured to implement one or more of the functions described below in relation to FIG. 15, including, e.g., block 1506.

In some aspects of the disclosure, the processor 1304 may include DRX management circuitry 1342 configured for various functions, including, for example, configuring a sidelink DRX mode using one or more sidelink discontinuous reception (DRX) parameters based on the DFN timing. For example, the DRX management circuitry 1342 may be configured to implement one or more of the functions described below in relation to FIGS. 14 and 15, including, e.g., blocks 1404 and 1510.

In some aspects of the disclosure, the processor 1304 may include communication management circuitry 1344 configured for various functions, including, for example, performing a sidelink communication with a second UE during an on-duration of a sidelink DRX cycle in the sidelink DRX mode according to the one or more sidelink DRX parameters. For example, the communication management circuitry 1344 may be configured to implement one or more of the functions described below in relation to FIGS. 14 and 15, including, e.g., blocks 1406 and 1520.

In some aspects, the communication management circuitry 1344 may be configured for various functions, including, for example, receiving, from a base station, a GNSS synchronization indicator indicating whether the base station is synchronized to a GNSS time. For example, the communication management circuitry 1344 may be configured to implement one or more of the functions described below in relation to FIG. 15, including, e.g., block 1504.

In some aspects, the communication management circuitry 1344 may be configured for various functions, including, for example, refraining, if the GNSS synchronization indicator indicates that the base station is not synchronized to the GNSS time, from transmitting the sidelink communication to the second UE during at least a portion of a first frame corresponding to a first DFN based on the DFN timing and/or at least a portion of a last frame corresponding to a last DFN based on the DFN timing. For example, the communication management circuitry 1344 may be configured to implement one or more of the functions described below in relation to FIG. 15, including, e.g., block 1512.

In some aspects, the communication management circuitry 1344 may be configured for various functions, including, for example, utilizing, if the GNSS synchronization indicator indicates that the base station is synchronized to the GNSS time, at least one of the first frame or the last frame to perform the sidelink communication with the second. For example, the communication management circuitry 1344 may be configured to implement one or more of the functions described below in relation to FIG. 15, including, e.g., block 1514.

In some aspects, the communication management circuitry 1344 may be configured for various functions, including, for example, receiving, from a base station, a skip indicator indicating to refrain transmitting the sidelink communication for at least a portion of a first frame corresponding to a first DFN based on the DFN timing and/or at least a portion of a last frame corresponding to a last DFN based on the DFN timing. For example, the communication management circuitry 1344 may be configured to implement one or more of the functions described below in relation to FIG. 15, including, e.g., block 1516.

In some aspects, the communication management circuitry 1344 may be configured for various functions, including, for example, refraining from transmitting the sidelink communication with the second UE during the at least the portion of the first frame and/or the at least the portion of the last frame based on the skip indicator. For example, the communication management circuitry 1344 may be configured to implement one or more of the functions described below in relation to FIG. 15, including, e.g., block 1518.

The processor 1304 is responsible for managing the bus 1302 and general processing, including the execution of software stored on the computer-readable storage medium 1306. The software, when executed by the processor 1304, causes the processing system 1314 to perform the various functions described below for any particular apparatus. The computer-readable storage medium 1306 and the memory 1305 may also be used for storing data that is manipulated by the processor 1304 when executing software.

One or more processors 1304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable storage medium 1306. The computer-readable storage medium 1306 may be a non-transitory computer-readable storage medium. A non-transitory computer-readable storage medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable storage medium 1306 may reside in the processing system 1314, external to the processing system 1314, or distributed across multiple entities including the processing system 1314. The computer-readable storage medium 1306 may be embodied in a computer program product. By way of example, a computer program product may include a computer-readable storage medium in packaging materials. Those skilled in the art will recognize how best to implement the described functionality presented throughout this disclosure depending on the particular application and the overall design constraints imposed on the overall system.

In some aspects of the disclosure, the computer-readable storage medium 1306, may include DFN management software/instructions 1360 configured for various functions, including, for example, determining a DFN timing. For example, the DFN management software/instructions 1360 may be configured to implement one or more of the functions described below in relation to FIGS. 14 and 15, including, e.g., blocks 1402 and 1508.

In some aspects, the DFN management software/instructions 1360 may be configured for various functions, including, for example, receiving a DFN indicator from a base station. For example, the DFN management software/instructions 1360 may be configured to implement one or more of the functions described below in relation to FIG. 15, including, e.g., block 1502.

In some aspects, the DFN management software/instructions 1360 may be configured for various functions, including, for example, determining a GNSS time. For example, the DFN management software/instructions 1360 may be configured to implement one or more of the functions described below in relation to FIG. 15, including, e.g., block 1506.

In some aspects of the disclosure, the computer-readable storage medium 1306, may include DRX management software/instructions 1362 configured for various functions, including, for example, configuring a sidelink DRX mode using one or more sidelink DRX parameters based on the DFN timing. For example, the DRX management software/instructions 1362 may be configured to implement one or more of the functions described below in relation to FIGS. 14 and 15, including, e.g., blocks 1404 and 1510.

In some aspects of the disclosure, the computer-readable storage medium 1306, may include communication management software/instructions 1364 configured for various functions, including, for example, performing a sidelink communication with a second UE during an on-duration of a sidelink DRX cycle in the sidelink DRX mode according to the one or more sidelink DRX parameters. For example, the communication management software/instructions 1364 may be configured to implement one or more of the functions described below in relation to FIGS. 14 and 15, including, e.g., blocks 1406 and 1520.

In some aspects, the communication management software/instructions 1364 may be configured for various functions, including, for example, receiving, from a base station, a GNSS synchronization indicator indicating whether the base station is synchronized to a GNSS time. For example, the communication management software/instructions 1364 may be configured to implement one or more of the functions described below in relation to FIG. 15, including, e.g., block 1504.

In some aspects, the communication management software/instructions 1364 may be configured for various functions, including, for example, refraining, if the GNSS synchronization indicator indicates that the base station is not synchronized to the GNSS time, from transmitting the sidelink communication to the second UE during at least a portion of a first frame corresponding to a first DFN based on the DFN timing and/or at least a portion of a last frame corresponding to a last DFN based on the DFN timing. For example, the communication management software/instructions 1364 may be configured to implement one or more of the functions described below in relation to FIG. 15, including, e.g., block 1512.

In some aspects, the communication management software/instructions 1364 may be configured for various functions, including, for example, utilizing, if the GNSS synchronization indicator indicates that the base station is synchronized to the GNSS time, at least one of the first frame or the last frame to perform the sidelink communication with the second UE. For example, the communication management software/instructions 1364 may be configured to implement one or more of the functions described below in relation to FIG. 15, including, e.g., block 1514.

In some aspects, the communication management software/instructions 1364 may be configured for various functions, including, for example, receiving, from a base station, a skip indicator indicating to refrain transmitting the sidelink communication for at least a portion of a first frame corresponding to a first DFN based on the DFN timing and/or at least a portion of a last frame corresponding to a last DFN based on the DFN timing. For example, the communication management software/instructions 1364 may be configured to implement one or more of the functions described below in relation to FIG. 15, including, e.g., block 1516.

In some aspects, the communication management software/instructions 1364 may be configured for various functions, including, for example, refraining from transmitting the sidelink communication with the second UE during the at least the portion of the first frame and/or the at least the portion of the last frame based on the skip indicator. For example, the communication management software/instructions 1364 may be configured to implement one or more of the functions described below in relation to FIG. 15, including, e.g., block 1518.

Figure 14:
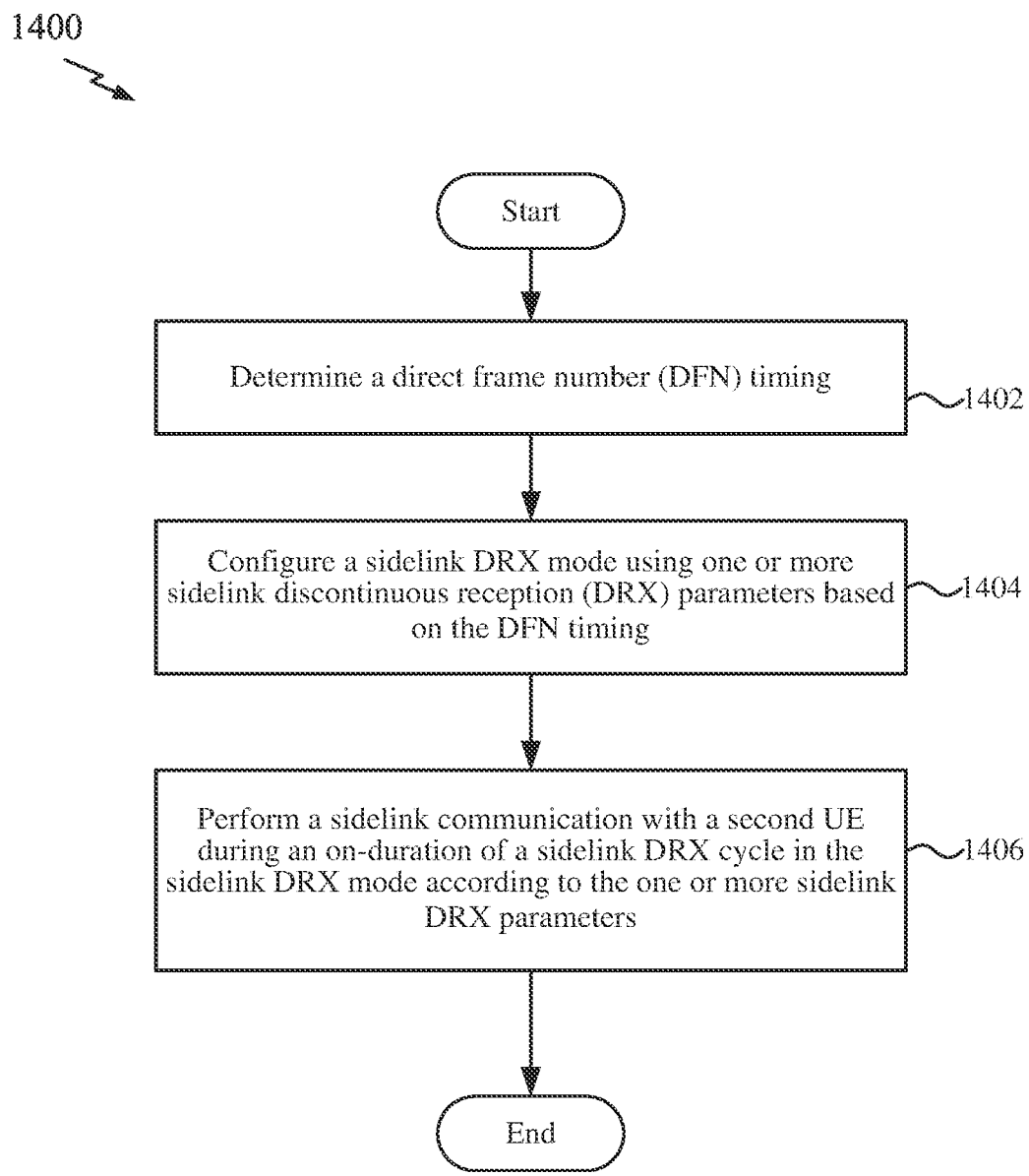
FIG. 14 is a flow chart illustrating an exemplary process for wireless communication according to some aspects.

FIG. 14 is a flow chart illustrating an exemplary process 1400 for wireless communication in accordance with some aspects of the present disclosure. As described below, some or all illustrated features may be omitted in a particular implementation within the scope of the present disclosure, and some illustrated features may not be required for implementation of all embodiments. In some examples, the process 1400 may be carried out by the UE 1300 illustrated in FIG. 13. In some examples, the process 1400 may be carried out by any suitable apparatus or means for carrying out the functions or algorithm described below.

At block 1402, the UE 1300 may determine a DFN timing. For example, the DFN management circuitry 1340 shown and described above in connection with FIG. 13 may provide means for determining the DFN timing.

At block 1404, the UE 1300 may configure a sidelink DRX mode using one or more DRX parameters based on the DFN timing. For example, the DRX management circuitry 1342 shown and described above in connection with FIG. 13 may provide means for configuring the sidelink DRX mode.

In an aspect, the one or more sidelink DRX parameters may include at least one of: the on-duration of the sidelink DRX cycle, an offset duration indicating a delay between a reference time for starting the sidelink DRX mode and a first instance of the sidelink DRX cycle, a duration of the sidelink DRX cycle, or a number of DRX cycles for the sidelink DRX mode. In an aspect, the offset duration may be based on a DFN corresponding to the DFN timing, a subframe number of a subframe associated with the DFN, and the duration of the sidelink DRX cycle. In an aspect, the offset duration may be based on a remainder determined by dividing a sum of the subframe number and a product of the DFN and 10 by the duration of the sidelink DRX cycle.

At block 1406, the UE 1300 may perform a sidelink communication with a second UE during an on-duration of a sidelink DRX cycle in the sidelink DRX mode according to the one or more sidelink DRX parameters. For example, the communication management circuitry 1344 shown and described above in connection with FIG. 13 may provide means for performing the sidelink communication.

Figure 15:
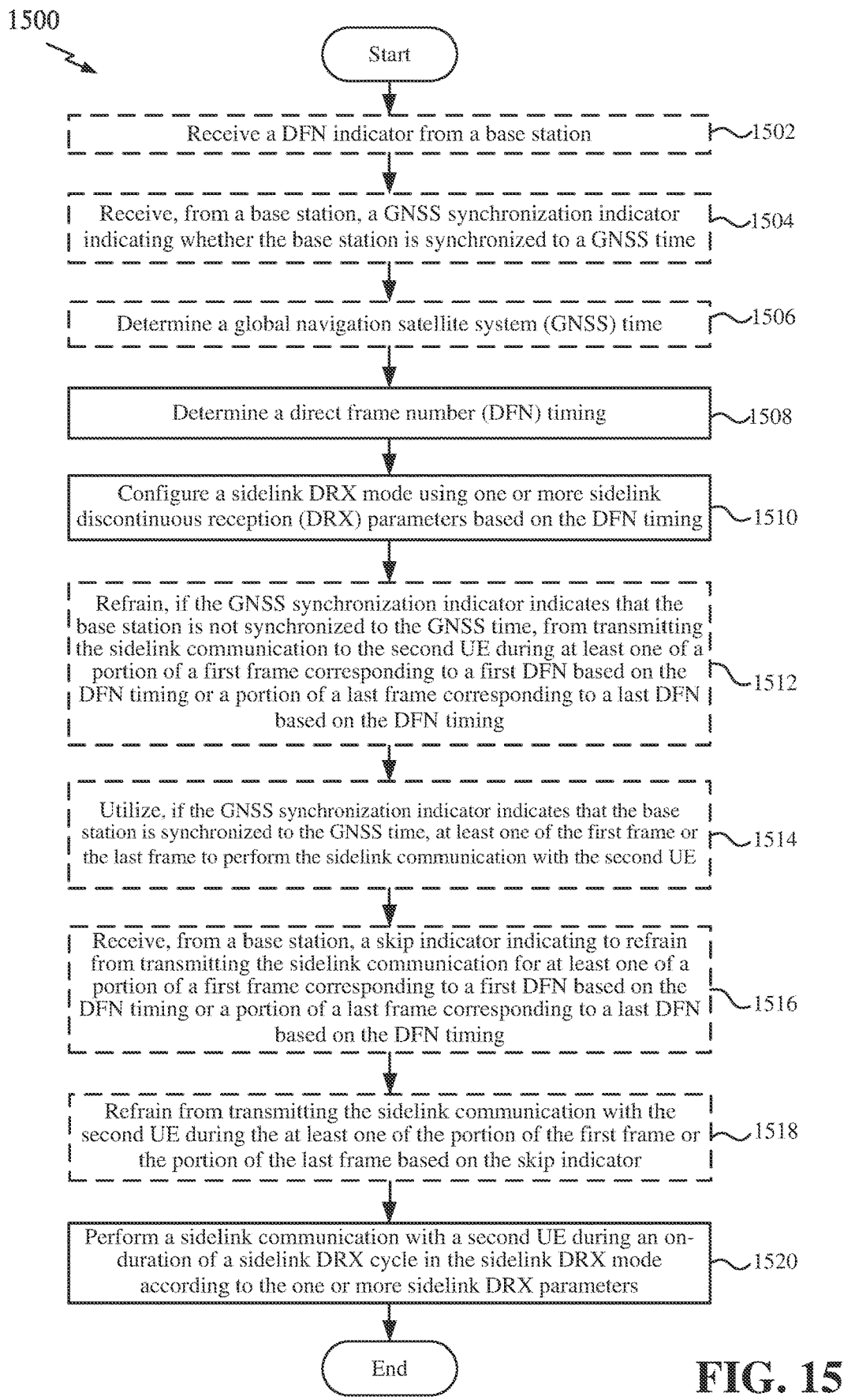
FIG. 15 is a flow chart illustrating an exemplary process for wireless communication according to some aspects.

FIG. 15 is a flow chart illustrating an exemplary process 1500 for wireless communication in accordance with some aspects of the present disclosure. As described below, some or all illustrated features may be omitted in a particular implementation within the scope of the present disclosure, and some illustrated features may not be required for implementation of all embodiments. In some examples, the process 1500 may be carried out by the UE 1300 illustrated in FIG. 13. In some examples, the process 1500 may be carried out by any suitable apparatus or means for carrying out the functions or algorithm described below.

At block 1502, in an aspect, the UE 1300 may receive a DFN indicator from a base station. For example, the DFN management circuitry 1340 shown and described above in connection with FIG. 13 may provide means for receiving the DFN indicator.

At block 1504, in an aspect, the UE 1300 may receive, from the base station, a GNSS synchronization indicator indicating whether the base station is synchronized to a GNSS time. For example, the communication management circuitry 1344 shown and described above in connection with FIG. 13 may provide means for receiving the GNSS synchronization indicator.

At block 1506, in an aspect, the UE 1300 may determine a GNSS time. For example, the DFN management circuitry 1340 shown and described above in connection with FIG. 13 may provide means for determining the GNSS time.

At block 1508, the UE 1300 may determine a DFN timing. For example, the DFN management circuitry 1340 shown and described above in connection with FIG. 13 may provide means for determining the DFN timing.

In an aspect, determining the DFN timing at block 1508 may include determining the DFN timing based on the GNSS time determined at block 1506.

In an aspect, determining the DFN timing at block 1508 may include determining the DFN timing based on the DFN indicator received at block 1502. In an aspect, the DFN indicator may include at least one of: an offset value indicative of a difference between the DFN timing and a SFN timing associated with the base station, the DFN timing, or a GNSS time. In an aspect, at least one of the offset value or the DFN timing may be based on the GNSS time. In an aspect, the DFN indicator may include an offset value indicative of a difference between the DFN timing and an SFN timing associated with the base station, and the offset value may be based on a GNSS time. In an aspect, the DFN timing may be based on a GNSS time. In an aspect, the DFN indicator may be received via at least one of a SIB, an RRC message, a PBCH, or a MAC-CE.

At block 1510, the UE 1300 may configure a sidelink DRX mode using one or more sidelink DRX parameters based on the DFN timing. For example, the DRX management circuitry 1342 shown and described above in connection with FIG. 13 may provide means for configuring the sidelink DRX mode.

In an aspect, the one or more sidelink DRX parameters may include at least one of: the on-duration of the sidelink DRX cycle, an offset duration indicating a delay between a reference time for starting the sidelink DRX mode and a first instance of the sidelink DRX cycle, a duration of the sidelink DRX cycle, or a number of DRX cycles for the sidelink DRX mode. In an aspect, the offset duration may be based on a DFN corresponding to the DFN timing, a subframe number of a subframe associated with the DFN, and the duration of the sidelink DRX cycle. In an aspect, the offset duration may be based on a remainder determined by dividing a sum of the subframe number and a product of the DFN and 10 by the duration of the sidelink DRX cycle.

At block 1512, in an aspect, the UE 1300 may refrain, if the GNSS synchronization indicator indicates that the base station is not synchronized to the GNSS time, from transmitting the sidelink communication to the second UE during at least one of a portion of a first frame corresponding to a first DFN based on the DFN timing or a portion of a last frame corresponding to a last DFN based on the DFN timing. For example, the communication management circuitry 1344 shown and described above in connection with FIG. 13 may provide means for refraining from transmitting the sidelink communication during the at least the portion of a first frame and/or during the at least the portion of the last frame.

At block 1514, in an aspect, the UE 1300 may utilize, if the GNSS synchronization indicator indicates that the base station is synchronized to the GNSS time, at least one of the first frame or the last frame to perform the sidelink communication with the second UE. For example, the communication management circuitry 1344 shown and described above in connection with FIG. 13 may provide means for utilizing the at least one of the first frame or the last frame to perform the sidelink communication.

In an aspect, the sidelink communication may be performed further based on the GNSS synchronization indicator.

At block 1516, in an aspect, the UE 1300 may receive, from a base station, a skip indicator indicating to refrain from transmitting the sidelink communication for at least one of a portion of a first frame corresponding to a first DFN based on the DFN timing or a portion of a last frame corresponding to a last DFN based on the DFN timing. For example, the communication management circuitry 1344 shown and described above in connection with FIG. 13 may provide means for receiving the skip indicator. In an aspect, the skip indicator may be received when the base station is not synchronized to a GNSS time. In an aspect, the skip indicator may indicate at least one of: a first number of slots in the first frame to be skipped for the sidelink communication, or a second number of slots in the last frame to be skipped for the sidelink communication.

At block 1518, in an aspect, the UE 1300 may refrain from transmitting the sidelink communication with the second UE during the at least one of the portion of the first frame or the portion of the last frame based on the skip indicator. For example, the communication management circuitry 1344 shown and described above in connection with FIG. 13 may provide means for refraining from transmitting the sidelink communication during the at least the portion of a first frame and/or during the at least the portion of the last frame.

At block 1520, the UE 1300 may perform a sidelink communication with a second UE during an on-duration of a sidelink DRX cycle in the sidelink DRX mode according to the one or more sidelink DRX parameters. For example, the communication management circuitry 1344 shown and described above in connection with FIG. 13 may provide means for performing the sidelink communication.

In one configuration, the UE 1300 for wireless communication includes means for determining a DFN timing, means for configuring a sidelink DRX mode using one or more sidelink DRX parameters based on the DFN timing, and means for performing a sidelink communication with a second UE during an on-duration of a sidelink DRX cycle in the sidelink DRX mode according to the one or more sidelink DRX parameters.

In an aspect, the UE 1300 may further include means for determining a GNSS time. In an aspect, the UE 1300 may further include means for receiving a DFN indicator from a base station. In an aspect, the UE 1300 may further include means for receiving, from a base station, a GNSS synchronization indicator indicating whether the base station is synchronized to a GNSS time. In an aspect, the UE 1300 may further include means for refraining, if the GNSS synchronization indicator indicates that the base station is not synchronized to the GNSS time, from transmitting the sidelink communication to the second UE during at least a portion of a first frame corresponding to a first DFN based on the DFN timing and/or at least a portion of a last frame corresponding to a last DFN based on the DFN timing, and means for utilizing, if the GNSS synchronization indicator indicates that the base station is synchronized to the GNSS time, at least one of the first frame or the last frame to perform the sidelink communication with the second UE. In an aspect, the UE 1300 may further include means for receiving, from a base station, a skip indicator indicating to refrain transmitting the sidelink communication for at least a portion of a first frame corresponding to a first DFN based on the DFN timing and/or at least a portion of a last frame corresponding to a last DFN based on the DFN timing, and means for refraining from transmitting the sidelink communication with the second UE during the at least the portion of the first frame and/or the at least the portion of the last frame based on the skip indicator.

In one aspect, the aforementioned means may be the processor(s) 1304 shown in FIG. 13 configured to perform the functions recited by the aforementioned means. In another aspect, the aforementioned means may be a circuit or any apparatus configured to perform the functions recited by the aforementioned means.

Of course, in the above examples, the circuitry included in the processor 1304 is merely provided as an example, and other means for carrying out the described functions may be included within various aspects of the present disclosure, including but not limited to the instructions stored in the computer-readable storage medium 1306, or any other suitable apparatus or means described in any one of the FIGS. 1, 2, 4, 8, and/or 12, and utilizing, for example, the processes and/or algorithms described herein in relation to FIGS. 14 and/or 15.

Figure 16:
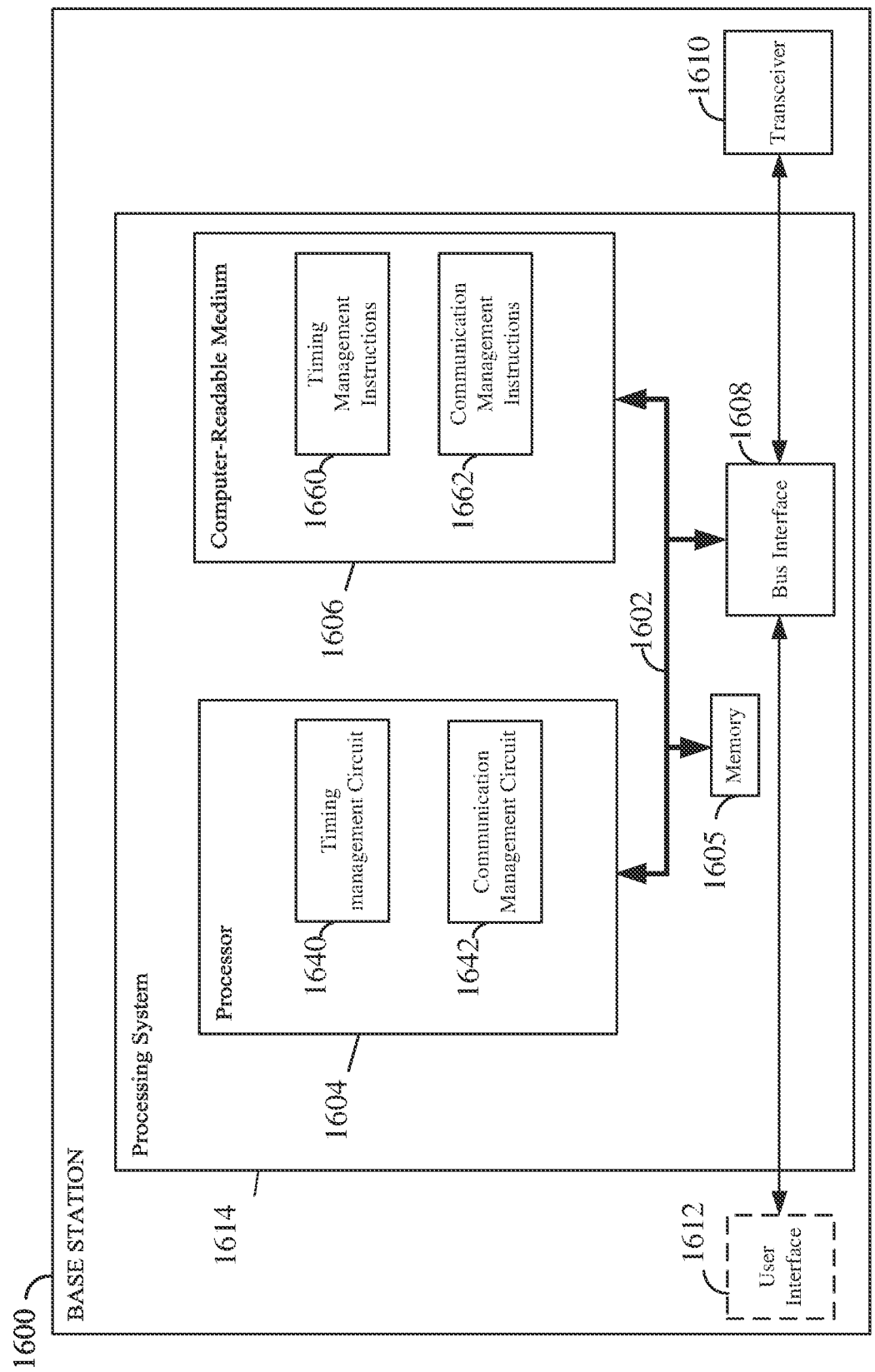
FIG. 16 is a block diagram conceptually illustrating an example of a hardware implementation for a base station according to some aspects.

FIG. 16 is a conceptual diagram illustrating an example of a hardware implementation for an exemplary base station 1600 employing a processing system 1614. In accordance with various aspects of the disclosure, an element, or any portion of an element, or any combination of elements may be implemented with a processing system 1614 that includes one or more processors 1604. For example, the base station 1600 may be a user equipment (UE) as illustrated in any one or more of FIGS. 1, 2, and/or 3.

The processing system 1614 may be substantially the same as the processing system 1314 illustrated in FIG. 13, including a bus interface 1608, a bus 1602, memory 1605, a processor 1604, and a computer-readable storage medium 1606. Furthermore, the base station 1600 may include a user interface 1612 and a transceiver 1610 substantially similar to those described above in FIG. 13. That is, the processor 1604, as utilized in a base station 1600, may be used to implement any one or more of the processes described below and illustrated in FIGS. 17-18. Of course, such a user interface 1612 is optional, and may be omitted in some examples, such as a base station.

In some aspects of the disclosure, the processor 1604 may include timing management circuitry 1640 configured for various functions, including, for example, determining a DFN indicator. For example, the timing management circuitry 1640 may be configured to implement one or more of the functions described below in relation to FIGS. 17 and 18, including, e.g., blocks 1702 and 1802.

In some aspects, the timing management circuitry 1640 may be configured for various functions, including, for example, determining that the base station is not synchronized to the GNSS time. For example, the timing management circuitry 1640 may be configured to implement one or more of the functions described below in relation to FIG. 18, including, e.g., block 1806.

In some aspects of the disclosure, the processor 1604 may include communication management circuitry 1642 configured for various functions, including, for example, transmitting the DFN indicator to a first user equipment (UE) to cause the first UE to configure a sidelink DRX mode using one or more sidelink DRX parameters based on a DFN timing that is based on the DFN indicator. For example, the communication management circuitry 1642 may be configured to implement one or more of the functions described below in relation to FIGS. 17 and 18, including, e.g., blocks 1704 and 1804.

In some aspects, the communication management circuitry 1642 may be configured for various functions, including, for example, transmitting a GNSS synchronization indicator indicating whether the base station is synchronized to the GNSS time. For example, the communication management circuitry 1642 may be configured to implement one or more of the functions described below in relation to FIG. 18, including, e.g., block 1808.

In some aspects, the communication management circuitry 1642 may be configured for various functions, including, for example, transmitting a skip indicator indicating to refrain transmitting the sidelink communication for at least a portion of a first frame corresponding to a first DFN based on the DFN timing and/or at least a portion of a last frame corresponding to a last DFN based on the DFN timing, to cause the first UE to refrain from transmitting the sidelink communication to the second UE during the at least the portion of the first frame and/or the at least the portion of the last frame based on the skip indicator. For example, the communication management circuitry 1642 may be configured to implement one or more of the functions described below in relation to FIG. 18, including, e.g., block 1810.

In some aspects of the disclosure, the computer-readable storage medium 1306 may include timing management software/instructions 1660 configured for various functions, including, for example, determining a DFN indicator. For example, the timing management software/instructions 1660 may be configured to implement one or more of the functions described below in relation to FIGS. 17 and 18, including, e.g., blocks 1702 and 1802.

In some aspects, the timing management software/instructions 1660 may be configured for various functions, including, for example, determining that the base station is not synchronized to the GNSS time. For example, the timing management software/instructions 1660 may be configured to implement one or more of the functions described below in relation to FIG. 18, including, e.g., block 1806.

In some aspects of the disclosure, the computer-readable storage medium 1306 may include communication management software/instructions 1662 configured for various functions, including, for example, transmitting the DFN indicator to a first user equipment (UE) to cause the first UE to configure a sidelink DRX mode using one or more DRX parameters based on a DFN timing that is based on the DFN indicator. For example, the communication management software/instructions 1662 may be configured to implement one or more of the functions described below in relation to FIGS. 17 and 18, including, e.g., blocks 1704 and 1804.

In some aspects, the communication management software/instructions 1662 may be configured for various functions, including, for example, transmitting a GNSS synchronization indicator indicating whether the base station is synchronized to the GNSS time. For example, the communication management software/instructions 1662 may be configured to implement one or more of the functions described below in relation to FIG. 18, including, e.g., block 1808.

In some aspects, the communication management software/instructions 1662 may be configured for various functions, including, for example, transmitting a skip indicator indicating to refrain transmitting the sidelink communication for at least a portion of a first frame corresponding to a first DFN based on the DFN timing and/or at least a portion of a last frame corresponding to a last DFN based on the DFN timing, to cause the first UE to refrain from transmitting the sidelink communication to the second UE during the at least the portion of the first frame and/or the at least the portion of the last frame based on the skip indicator. For example, the communication management software/instructions 1662 may be configured to implement one or more of the functions described below in relation to FIG. 18, including, e.g., block 1810.

Figure 17:
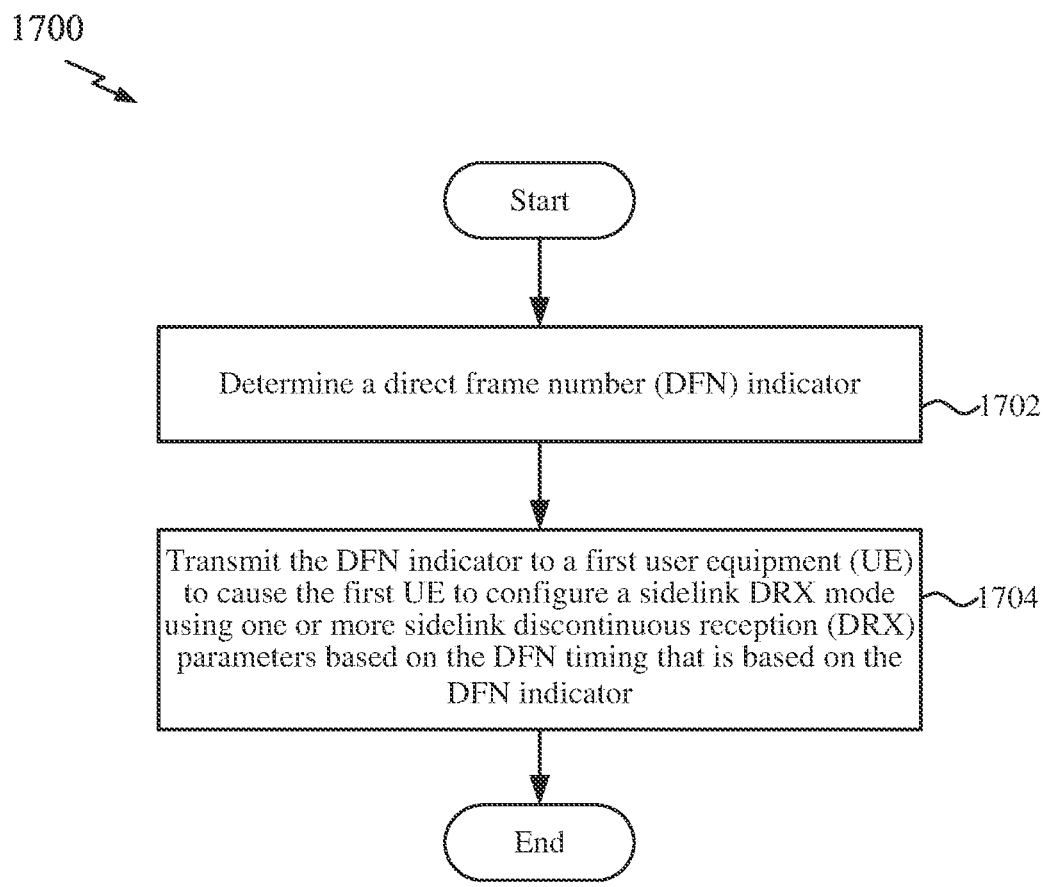
FIG. 17 is a flow chart illustrating an exemplary process for wireless communication according to some aspects.

FIG. 17 is a flow chart illustrating an exemplary process 1700 for wireless communication in accordance with some aspects of the present disclosure. As described below, some or all illustrated features may be omitted in a particular implementation within the scope of the present disclosure, and some illustrated features may not be required for implementation of all embodiments. In some examples, the process 1700 may be carried out by the base station 1600 illustrated in FIG. 16. In some examples, the process 1700 may be carried out by any suitable apparatus or means for carrying out the functions or algorithm described below.

At block 1702, the base station 1600 may determine a DFN indicator. For example, the timing management circuitry 1640 shown and described above in connection with FIG. 16 may provide means for determining the DFN indicator.

At block 1704, the base station 1600 may transmit the DFN indicator to a first user equipment (UE) to cause the first UE to configure a sidelink DRX mode using one or more sidelink DRX parameters based on a DFN timing that is based on the DFN indicator. For example, the communication management circuitry 1642 shown and described above in connection with FIG. 16 may provide means for transmitting the DFN indicator.

In an aspect, the one or more sidelink DRX parameters may include at least one of: the on-duration of the sidelink DRX cycle, an offset duration indicating a delay between a reference time for starting the sidelink DRX mode and a first instance of the sidelink DRX cycle, a duration of the sidelink DRX cycle, or a number of DRX cycles for the sidelink DRX mode. In an aspect, the offset duration may be based on a DFN corresponding to the DFN timing, a subframe number of a subframe associated with the DFN, and the duration of the sidelink DRX cycle. In an aspect, the offset duration may be based on a remainder determined by dividing a sum of the subframe number and a product of the DFN and 10 by the duration of the sidelink DRX cycle.

Figure 18:
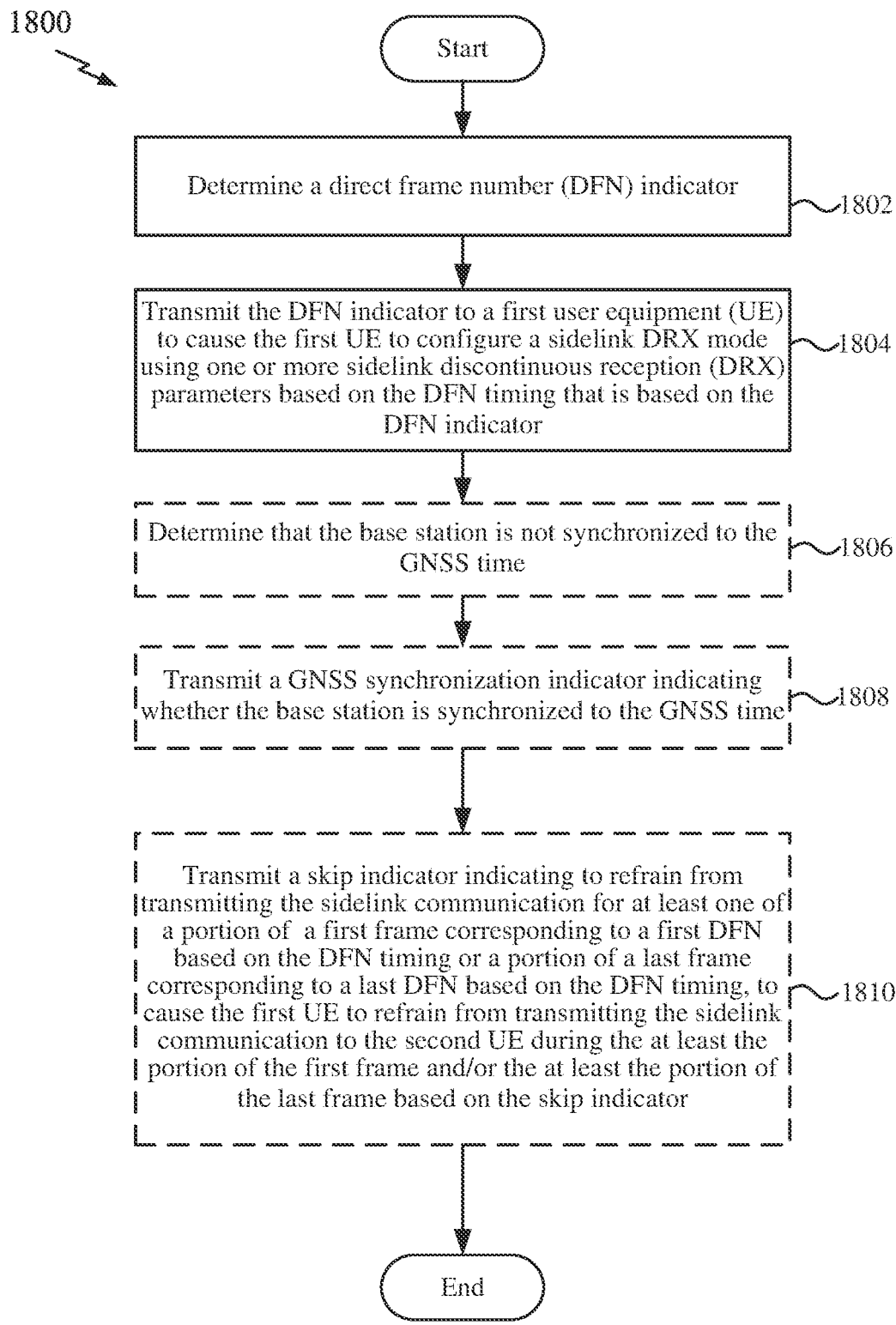
FIG. 18 is a flow chart illustrating an exemplary process for wireless communication according to some aspects.

FIG. 18 is a flow chart illustrating an exemplary process 1800 for wireless communication in accordance with some aspects of the present disclosure. As described below, some or all illustrated features may be omitted in a particular implementation within the scope of the present disclosure, and some illustrated features may not be required for implementation of all embodiments. In some examples, the process 1800 may be carried out by the base station 1600 illustrated in FIG. 16. In some examples, the process 1800 may be carried out by any suitable apparatus or means for carrying out the functions or algorithm described below.

At block 1802, the base station 1600 may determine a DFN indicator. For example, the timing management circuitry 1640 shown and described above in connection with FIG. 16 may provide means for determining the DFN indicator.

At block 1804, the base station 1600 may transmit the DFN indicator to a first user equipment (UE) to cause the first UE to configure a sidelink DRX mode using one or more sidelink DRX parameters based on a DFN timing that is based on the DFN indicator. For example, the communication management circuitry 1642 shown and described above in connection with FIG. 16 may provide means for transmitting the DFN indicator. In an aspect, a sidelink communication between the first UE and a second UE may be performed during an on-duration of a sidelink DRX cycle in the sidelink DRX mode according to the one or more sidelink DRX parameters.

In an aspect, the one or more sidelink DRX parameters may include at least one of: the on-duration of the sidelink DRX cycle, an offset duration indicating a delay between a reference time for starting the sidelink DRX mode and a first instance of the sidelink DRX cycle, a duration of the sidelink DRX cycle, or a number of DRX cycles for the sidelink DRX mode. In an aspect, the offset duration may be based on a DFN corresponding to the DFN timing, a subframe number of a subframe associated with the DFN, and the duration of the sidelink DRX cycle. In an aspect, the offset duration may be based on a remainder determined by dividing a sum of the subframe number and a product of the DFN and 10 by the duration of the sidelink DRX cycle.

In an aspect, the DFN indicator may include at least one of: an offset value indicative of a difference between the DFN timing and a SFN timing associated with the base station, the DFN timing, or a GNSS time. In an aspect, the determining the DFN indicator at 1802 may include determining at least one of the offset value or the DFN timing based on the GNSS time. In an aspect, the DFN indicator comprises an offset value indicative of a difference between the DFN timing and an SFN timing associated with the base station, and the offset value is based on a GNSS time. In an aspect, the DFN timing is based on a GNSS time. In an aspect, the DFN indicator may be transmitted via at least one of a SIB, an RRC message, a PBCH, or a MAC-CE.

At block 1806, in an aspect, the base station 1600 may determine that the base station is not synchronized to the GNSS time. For example, the timing management circuitry 1640 shown and described above in connection with FIG. 16 may provide means for determining that the base station is not synchronized to the GNSS time.

At block 1808, in an aspect, the base station 1600 may transmit a GNSS synchronization indicator indicating whether the base station is synchronized to the GNSS time. For example, the communication management circuitry 1642 shown and described above in connection with FIG. 16 may provide means for transmitting the GNSS synchronization indicator. In an aspect, the sidelink communication may be performed further based on the GNSS synchronization indicator.

At block 1810, in an aspect, the base station 1600 may transmit a skip indicator indicating to refrain from transmitting the sidelink communication for a portion of a first frame corresponding to at least one of a first DFN based on the DFN timing or a portion of a last frame corresponding to a last DFN based on the DFN timing, to cause the first UE to refrain from transmitting the sidelink communication to the second UE during the at least one of the portion of the first frame or the portion of the last frame based on the skip indicator. For example, the communication management circuitry 1642 shown and described above in connection with FIG. 16 may provide means for transmitting the skip indicator. In an aspect, the skip indicator may be transmitted in response to determining that the base station is not synchronized to the GNSS time at block 1806. In an aspect, the skip indicator may indicate at least one of: a first number of slots in the first frame to be skipped for the sidelink communication, or a second number of slots in the last frame to be skipped for the sidelink communication.

In one configuration, the base station 1600 for wireless communication includes means for determining a DFN indicator and means for transmitting the DFN indicator to a first user equipment (UE) to cause the first UE to configure a sidelink DRX mode using sidelink DRX parameters based on a DFN timing that is based on the DFN indicator. In an aspect, the base station 1600 may further include means for transmitting a GNSS synchronization indicator indicating whether the base station is synchronized to the GNSS time. In an aspect, the base station 1600 may further include means for transmitting a skip indicator indicating to refrain transmitting the sidelink communication for at least a portion of a first frame corresponding to a first DFN based on the DFN timing and/or at least a portion of a last frame corresponding to a last DFN based on the DFN timing, to cause the first UE to refrain from transmitting the sidelink communication to the second UE during the at least the portion of the first frame and/or the at least the portion of the last frame based on the skip indicator. In an aspect, the base station 1600 may further include means for determining that the base station is not synchronized to the GNSS time.

In one aspect, the aforementioned means may be the processor(s) 1604 shown in FIG. 16 configured to perform the functions recited by the aforementioned means. In another aspect, the aforementioned means may be a circuit or any apparatus configured to perform the functions recited by the aforementioned means.

Of course, in the above examples, the circuitry included in the processor 1604 is merely provided as an example, and other means for carrying out the described functions may be included within various aspects of the present disclosure, including but not limited to the instructions stored in the computer-readable storage medium 1606, or any other suitable apparatus or means described in any one of the FIGS. 1, 2, 4, 8, and/or 12, and utilizing, for example, the processes and/or algorithms described herein in relation to FIGS. 17 and/or 18.

The following provides an overview of several aspects of the present disclosure.

Aspect 1: A method of wireless communication by a user equipment (UE), comprising: determining a direct frame number (DFN) timing, configuring a sidelink DRX mode using one or more sidelink discontinuous reception (DRX) parameters based on the DFN timing, and performing a sidelink communication with a second UE during an on-duration of a sidelink DRX cycle in the sidelink DRX mode according to the one or more sidelink DRX parameters.

Aspect 2: The method of aspect 1, further comprising: determining a global navigation satellite system (GNSS) time, and determining the DFN timing based on the GNSS time.

Aspect 3: The method of aspect 1, further comprising: receiving a DFN indicator from a base station, and determining the DFN timing based on the DFN indicator.

Aspect 4: The method of aspect 3, wherein the DFN indicator comprises at least one of: an offset value indicative of a difference between the DFN timing and a system frame number (SFN) timing associated with the base station, the DFN timing, or a global navigation satellite system (GNSS) time.

Aspect 5: The method of aspect 3, wherein the DFN indicator comprises an offset value indicative of a difference between the DFN timing and a system frame number (SFN) timing associated with the base station, and wherein the offset value is based on a global navigation satellite system (GNSS) time.

Aspect 6: The method of aspect 3, wherein the DFN timing is based on a global navigation satellite system (GNSS) time.

Aspect 7: The method of any of aspects 3 through 6, wherein the DFN indicator is received via at least one of: a system information block (SIB), a radio resource control (RRC) message, a physical broadcast channel (PBCH), or a medium access control control element (MAC-CE).

Aspect 8: The method of any of aspects 1 through 7, further comprising: receiving, from a base station, a GNSS synchronization indicator indicating whether the base station is synchronized to a GNSS time, wherein the sidelink communication is performed further based on the GNSS synchronization indicator.

Aspect 9: The method of aspect 8, further comprising: refraining, if the GNSS synchronization indicator indicates that the base station is not synchronized to the GNSS time, from transmitting the sidelink communication to the second UE during at least one of a portion of a first frame corresponding to a first DFN based on the DFN timing or a portion of a last frame corresponding to a last DFN based on the DFN timing, and utilizing, if the GNSS synchronization indicator indicates that the base station is synchronized to the GNSS time, at least one of the first frame or the last frame to perform the sidelink communication with the second UE.

Aspect 10: The method of any of aspects 1 through 9, further comprising: receiving, from a base station, a skip indicator indicating to refrain from transmitting the sidelink communication for at least one of a portion of a first frame corresponding to a first DFN based on the DFN timing or a portion of a last frame corresponding to a last DFN based on the DFN timing, and refraining from transmitting the sidelink communication with the second UE during the at least one of the portion of the first frame or the portion of the last frame based on the skip indicator.

Aspect 11: The method of aspect 10, wherein the skip indicator is received when the base station is not synchronized to a GNSS time.

Aspect 12: The method of aspect 10 or 11, wherein the skip indicator indicates at least one of: a first number of slots in the first frame to be skipped for the sidelink communication, or a second number of slots in the last frame to be skipped for the sidelink communication.

Aspect 13: The method of any of aspects 1 through 12, wherein the one or more sidelink DRX parameters include at least one of: the on-duration of the sidelink DRX cycle, an offset duration indicating a delay between a reference time for starting the sidelink DRX mode and a first instance of the sidelink DRX cycle, a duration of the sidelink DRX cycle, or a number of DRX cycles for the sidelink DRX mode.

Aspect 14: The method of aspect 13, wherein the offset duration is based on a DFN corresponding to the DFN timing, a subframe number of a subframe associated with the DFN, and the duration of the sidelink DRX cycle.

Aspect 15: The method of aspect 14, wherein the offset duration is based on a remainder determined by dividing a sum of the subframe number and a product of the DFN and 10 by the duration of the sidelink DRX cycle.

Aspect 16: A user equipment (UE) for wireless communication comprising: a transceiver configured to communicate with a radio access network, a memory, and a processor communicatively coupled to the transceiver and the memory, wherein the processor and the memory are configured to perform any one of aspects 1 through 15.

Aspect 17: A UE for wireless communication configured for wireless communication comprising at least one means for performing any one of aspects 1 through 15.

Aspect 18: A non-transitory processor-readable storage medium having instructions for a UE thereon, wherein the instructions, when executed by a processing circuit, cause the processing circuit to perform any one of aspects 1 through 15.

Aspect 19: A method of wireless communication by a base station, comprising: determining a direct frame number (DFN) indicator, and transmitting the DFN indicator to a first user equipment (UE) to cause the first UE to configure a sidelink DRX mode using one or more sidelink discontinuous reception (DRX) parameters based on a DFN timing that is based on the DFN indicator, wherein a sidelink communication between the first UE and a second UE is performed during an on-duration of a sidelink DRX cycle in the sidelink DRX mode according to the one or more sidelink DRX parameters.

Aspect 20: The method of aspect 19, wherein the DFN indicator comprises at least one of: an offset value indicative of a difference between the DFN timing and a system frame number (SFN) timing, the DFN timing, or a global navigation satellite system (GNSS) time.

Aspect 21: The method of aspect 20, wherein the DFN indicator comprises an offset value indicative of a difference between the DFN timing and a system frame number (SFN) timing associated with the base station, and wherein the offset value is based on a global navigation satellite system (GNSS) time.

Aspect 22: The method of aspect 20, wherein the DFN timing is based on a global navigation satellite system (GNSS) time.

Aspect 23: The method of any of aspects 19 through 22, wherein the DFN indicator is transmitted via at least one of: a system information block (SIB), a radio resource control (RRC) message, a physical broadcast channel (PBCH), or a medium access control control element (MAC-CE).

Aspect 24: The method of any of aspects 19 through 23, further comprising: transmitting a GNSS synchronization indicator indicating whether the base station is synchronized to a global navigation satellite system (GNSS) time, wherein the sidelink communication is performed further based on the GNSS synchronization indicator.

Aspect 25: The method of any of aspects 19 through 24, further comprising: transmitting a skip indicator indicating to refrain transmitting the sidelink communication for at least a portion of a first frame corresponding to a first DFN based on the DFN timing and/or at least a portion of a last frame corresponding to a last DFN based on the DFN timing, to cause the first UE to refrain from transmitting the sidelink communication to the second UE during the at least the portion of the first frame and/or the at least the portion of the last frame based on the skip indicator.

Aspect 26: The method of aspect 25, further comprising: determining that the base station is not synchronized to a global navigation satellite system (GNSS) time, wherein the skip indicator is transmitted in response to determining that the base station is not synchronized to the GNSS time.

Aspect 27: The method of aspect 25 or 26, wherein the skip indicator indicates at least one of: a first number of slots in the first frame to be skipped for the sidelink communication, or a second number of slots in the last frame to be skipped for the sidelink communication.

Aspect 28: The method of any of aspects 19 through 27, wherein the one or more sidelink DRX parameters include at least one of: the on-duration of the sidelink DRX cycle, an offset duration indicating a delay between a reference time for starting the sidelink DRX mode and a first instance of the sidelink DRX cycle, a duration of the sidelink DRX cycle, or a number of DRX cycles for the sidelink DRX mode.

Aspect 29: The method of aspect 28, wherein the offset duration is based on a DFN corresponding to the DFN timing, a subframe number of a subframe associated with the DFN, and the duration of the sidelink DRX cycle.

Aspect 30: The method of aspect 29, wherein the offset duration is based on a remainder determined by dividing a sum of the subframe number and a product of the DFN and 10 by the duration of the sidelink DRX cycle.

Aspect 31: A base station for wireless communication comprising: a transceiver configured to communicate with a radio access network, a memory, and a processor communicatively coupled to the transceiver and the memory, wherein the processor and the memory are configured to perform any one of aspects 19 through 30.

Aspect 32: A base station for wireless communication configured for wireless communication comprising at least one means for performing any one of aspects 19 through 30.

Aspect 33: A non-transitory processor-readable storage medium having instructions for a base station thereon, wherein the instructions, when executed by a processing circuit, cause the processing circuit to perform any one of aspects 19 through 30.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-18 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-18 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example. "at least one of: a, b, or c" is intended to cover: a; b; c: a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A user equipment (UE) for wireless communication, comprising at least one memory, and one or more processors coupled to the at least one memory, wherein the one or more processors are configured to cause the UE to:

receive a direct frame number (DFN) indicator from a base station, wherein the DFN indicator comprises at least one of an offset value indicative of a difference between timing of DEN and a system frame number (SFN) timing, or a global navigation satellite system (GNSS) time;

determine a DFN timing based on the DEN indicator received from the base station;
configure a sidelink discontinuous reception (DRX) mode using one or more sidelink DRX parameters based on the DFN timing;
receive, from a base station, a GNSS synchronization indicator indicating whether the base station is synchronized to the GNSS time; and
perform a sidelink communication with a second UE during an on-duration of a sidelink DRX cycle in the sidelink DRX mode according to the one or more sidelink DRX parameters, wherein the sidelink communication is performed based on the GNSS synchronization indicator,
wherein the one or more processors are further configured to cause the UE to:
refrain, if the GNSS synchronization indicator indicates that the base station is not synchronized to the GNSS time, refrain from transmitting the sidelink communication to the second UE during at least one of a portion of a first frame corresponding to a first DFN based on the DFN timing or a portion of a last frame corresponding to a last DFN based on the DFN timing; and
utilize, if the GNSS synchronization indicator indicates that the base station is synchronized to the GNSS time, at least one of the first frame or the last frame to perform the sidelink communication with the second UE.

2. The UE of claim 1, wherein the one or more processors are configured to determine the GNSS time, and determine the DFN timing based on the GNSS time.

3. The UE of claim 1, wherein the offset value is based on the GNSS time.

4. The UE of claim 1, wherein the DFN timing is based on the GNSS time.

5. The UE of claim 1, wherein the one or more sidelink DRX parameters include at least one of: the on-duration of the sidelink DRX cycle, an offset duration indicating a delay between a reference time for starting the sidelink DRX mode and a first instance of the sidelink DRX cycle, a duration of the sidelink DRX cycle, or a number of DRX cycles for the sidelink DRX mode.

6. The UE of claim 5, wherein the offset duration is based on a DFN corresponding to the DFN timing, a subframe number of a subframe associated with the DFN, and the duration of the sidelink DRX cycle.

7. A user equipment (UE) for wireless communication, comprising at least one memory, and one or more processors coupled to the at least one memory, wherein the one or more processors are configured to cause the UE to:
receive a direct frame number (DFN) indicator from a base station, wherein the DEN indicator comprises at least one of an offset value indicative of a difference between timing of DFN and a system frame number (SFN) timing, or a global navigation satellite system (GNSS) time;
determine a DFN timing based on the DFN indicator received from the base station;
configure a sidelink discontinuous reception (DRX) mode using one or more sidelink DRX parameters based on the DFN timing;
perform a sidelink communication with a second UE during an on-duration of a sidelink DRX cycle in the sidelink DRX mode according to the one or more sidelink DRX parameters,
wherein the one or more processors are further configured to cause the UE to:
receive, from a base station, a skip indicator indicating to refrain from transmitting the sidelink communication for a portion of a first frame corresponding to a first DFN based on the DFN timing or a portion of a last frame corresponding to a last DFN based on the DFN timing; and
refrain from transmitting the sidelink communication with the second UE during the portion of the first frame or the portion of the last frame based on the skip indicator.

8. The UE of claim 7, wherein, to receive the skip indicator, the one or more processors are configured to cause the UE to receive the skip indicator when the base station is not synchronized to the GNSS time.

9. The UE of claim 7, wherein the skip indicator indicates at least one of:
a first number of slots in the first frame to be skipped for the sidelink communication, or
a second number of slots in the last frame to be skipped for the sidelink communication.

10. The UE of claim 7, wherein the one or more processors are configured to determine the GNSS time, and determine the DFN timing based on the GNSS time.

11. The UE of claim 7, wherein the offset value is based on the GNSS time.

12. The UE of claim 7, wherein the DFN timing is based on the GNSS time.

13. The UE of claim 7, wherein the one or more sidelink DRX parameters include at least one of: the on-duration of the sidelink DRX cycle, an offset duration indicating a delay between a reference time for starting the sidelink DRX mode and a first instance of the sidelink DRX cycle, a duration of the sidelink DRX cycle, or a number of DRX cycles for the sidelink DRX mode.

14. The UE of claim 13, wherein the offset duration is based on a DFN corresponding to the DFN timing, a subframe number of a subframe associated with the DFN, and the duration of the sidelink DRX cycle.

15. A method for wireless communication by a user equipment (UE), comprising:
receiving a direct frame number (DFN) indicator from a base station, wherein the DFN indicator comprises at least one of an offset value indicative of a difference between timing of DFN and a system frame number (SFN) timing, or a global navigation satellite system (GNSS) time;
determining a DFN timing based on the DFN indicator received from the base station;
configuring a sidelink discontinuous reception (DRX) mode using one or more sidelink DRX parameters based on the DFN timing;
receiving, from a base station, a GNSS synchronization indicator indicating whether the base station is synchronized to the GNSS time; and
performing a sidelink communication with a second UE during an on-duration of a sidelink DRX cycle in the sidelink DRX mode according to the one or more sidelink DRX parameters, wherein the sidelink communication is performed based on the GNSS synchronization indicator,
wherein the method further comprises:
refraining, if the GNSS synchronization indicator indicates that the base station is not synchronized to the GNSS time, refrain from transmitting the sidelink communication to the second UE during at least one of a portion of a first frame corresponding to a first DFN based on the DFN timing or a portion of a last frame corresponding to a last DFN based on the DFN timing; and utilizing, if the GNSS synchronization indicator indicates that the base station is synchronized to the GNSS time, at least one of the first frame or the last frame to perform the sidelink communication with the second UE.

16. The method of claim 15, wherein the method comprises determining the GNSS time, and determining the DFN timing based on the GNSS time.

17. The method of claim 15, wherein the offset value is based on the GNSS time.

18. The method of claim 15, wherein the DFN timing is based on the GNSS time.

19. The method of claim 15, wherein the one or more sidelink DRX parameters include at least one of: the on-duration of the sidelink DRX cycle, an offset duration indicating a delay between a reference time for starting the sidelink DRX mode and a first instance of the sidelink DRX cycle, a duration of the sidelink DRX cycle, or a number of DRX cycles for the sidelink DRX mode.

20. The method of claim 19, wherein the offset duration is based on a DEN corresponding to the DFN timing, a subframe number of a subframe associated with the DFN, and the duration of the sidelink DRX cycle.

21. A method for wireless communication by a user equipment (UE), comprising:

receiving a direct frame number (DFN) indicator from a base station, wherein the DFN indicator comprises at least one of an offset value indicative of a difference between timing of DFN and a system frame number (SFN) timing, or a global navigation satellite system (GNSS) time;

determining a DFN timing based on the DFN indicator received from the base station;

configuring a sidelink discontinuous reception (DRX) mode using one or more sidelink DRX parameters based on the DFN timing;

performing a sidelink communication with a second UE during an on-duration of a sidelink DRX cycle in the sidelink DRX mode according to the one or more sidelink DRX parameters, wherein the method further comprises:

receiving, from a base station, a skip indicator indicating to refrain from transmitting the sidelink communication for a portion of a first frame corresponding to a first DFN based on the DFN timing or a portion of a last frame corresponding to a last DFN based on the DFN timing; and refraining from transmitting the sidelink communication with the second UE during the portion of the first frame or the portion of the last frame based on the skip indicator.

22. The method of claim 21, wherein the skip indicator is received when the base station is not synchronized to the GNSS time.

23. The method of claim 21, wherein the skip indicator indicates at least one of:

a first number of slots in the first frame to be skipped for the sidelink communication, or a second number of slots in the last frame to be skipped for the sidelink communication.

24. The method of claim 21, wherein the method comprises determining the GNSS time, and determining the DFN timing based on the GNSS time.

25. The method of claim 21, wherein the offset value is based on the GNSS time.

26. The method of claim 21, wherein the DFN timing is based on the GNSS time.

27. The method of claim 21, wherein the one or more sidelink DRX parameters include at least one of: the on-duration of the sidelink DRX cycle, an offset duration indicating a delay between a reference time for starting the sidelink DRX mode and a first instance of the sidelink DRX cycle, a duration of the sidelink DRX cycle, or a number of DRX cycles for the sidelink DRX mode.

28. The method of claim 27, wherein the offset duration is based on a DFN corresponding to the DFN timing, a subframe number of a subframe associated with the DFN, and the duration of the sidelink DRX cycle.

* * * * *